United States Patent
Bienkowski et al.

(10) Patent No.: US 9,336,115 B1
(45) Date of Patent: May 10, 2016

(54) USER INTERFACE DRIVEN REAL-TIME PERFORMANCE EVALUATION OF PROGRAM CODE

(71) Applicant: The MathWorks, Inc., Natick, MA (US)

(72) Inventors: Joseph R. Bienkowski, Ashland, MA (US); Martin Knelleken, Bad Wunnenberg (DE); Benjamin V. Hinkle, Brookline, MA (US); Michelle D. Erickson, Watertown, MA (US); Jared D. MacDonald, Cambridge, MA (US); Claudia G. Wey, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 127 days.

(21) Appl. No.: 14/187,510

(22) Filed: Feb. 24, 2014

(51) Int. Cl.
*G06F 9/44* (2006.01)
*G06F 11/34* (2006.01)

(52) U.S. Cl.
CPC .................. *G06F 11/3409* (2013.01)

(58) Field of Classification Search
None
See application file for complete search history.

(56) References Cited

U.S. PATENT DOCUMENTS

| | | | | |
|---|---|---|---|---|
| 5,862,383 A | * | 1/1999 | Laitinen | 717/109 |
| 6,332,212 B1 | * | 12/2001 | Organ et al. | 717/128 |
| 8,375,368 B2 | * | 2/2013 | Tuck et al. | 717/130 |
| 8,762,939 B1 | * | 6/2014 | Ulug et al. | 717/109 |
| 2009/0089670 A1 | * | 4/2009 | Gooding et al. | 715/700 |
| 2011/0314453 A1 | * | 12/2011 | Tebeka et al. | 717/130 |
| 2012/0204161 A1 | * | 8/2012 | Ben-Artzi et al. | 717/137 |
| 2012/0254380 A1 | * | 10/2012 | Sobel et al. | 709/221 |
| 2013/0305095 A1 | * | 11/2013 | Chishiro | 714/38.1 |
| 2014/0082329 A1 | * | 3/2014 | Ghose | 712/208 |

OTHER PUBLICATIONS

Wikipedia, "Debugging", http://en.wikipedia.org/wiki/Debugging, Jan. 31, 2014, 6 pages.
Wikipedia, "Profiling (computer programming)", http://en.wikipedia.org/wiki/Profiling_(computer_programming), Feb. 5, 2014, 6 pages.

* cited by examiner

*Primary Examiner* — Insun Kang
*Assistant Examiner* — Devayani R Talukdar
(74) *Attorney, Agent, or Firm* — Harrity & Harrity, LLP

(57) ABSTRACT

A device may receive an indication to perform a performance evaluation on program code. The device may partition the program code into multiple program code portions based on receiving the indication to perform the performance evaluation. The device may execute a first program code portion of the multiple program code portions. The device may determine that the first program code portion has finished executing, and may determine a performance characteristic associated with execution of the first program code portion based on determining that the first program code portion has finished executing. The device may execute a second program code portion, of the multiple program code portions, and may provide information that identifies the performance characteristic while the second program code portion is being executed.

20 Claims, 31 Drawing Sheets

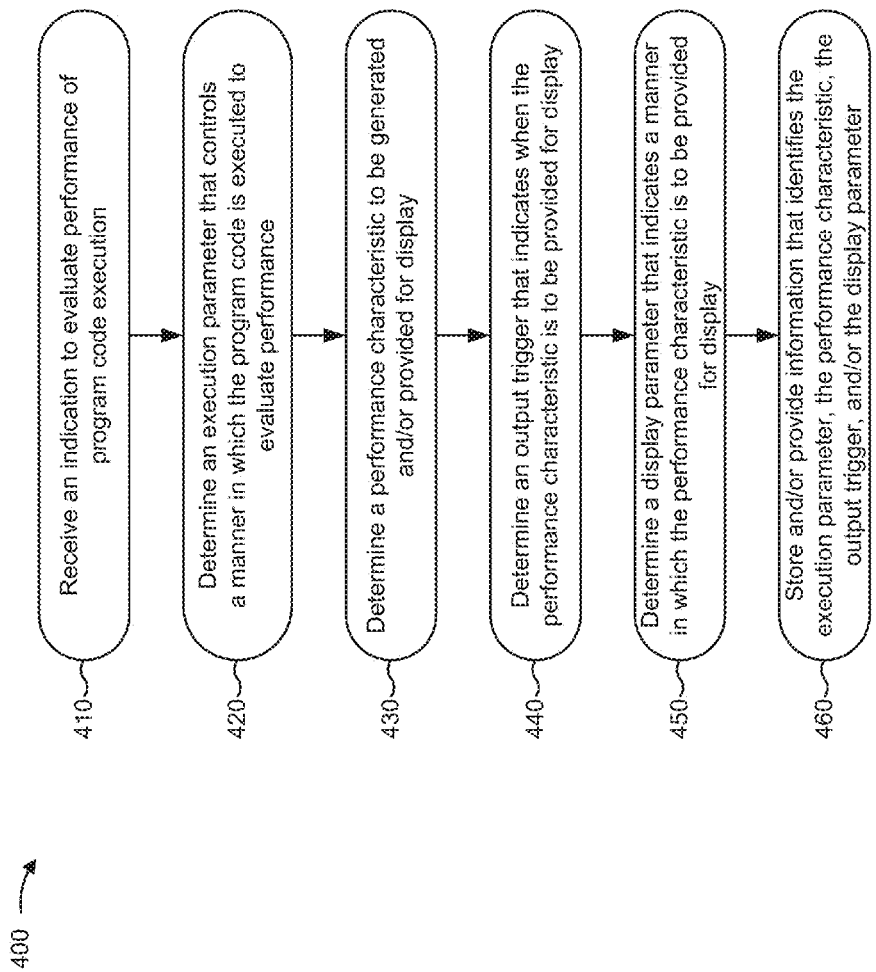

FIG. 5A

TECHNICAL COMPUTING ENVIRONMENT (TCE 220)

File | Edit | Tools | View | Execute

Code Editor W | Performance Evaluation
More Tools...

```
% Load and
load('ball')
plot(ball)

% Create a symbolic Hilbert matrix
H = sym(hilb(5))

% Invert the matrix
Hi = inv(vpa(H))

% Create a larger matrix
H2 = sym(hilb(80))

% Invert the larger matrix
H2i = inv(vpa(H2))

% Execute a function
Func(x, y)
```

FIG. 7A

TECHNICAL COMPUTING ENVIRONMENT (TCE 220)

File   Edit   Tools   View   Execute ← 705

Code Editor Window

```
% Load and plot some data
load('ball.mat')
plot(ball)

% Create a symbolic Hilbert matrix
H = sym(hilb(5))

% Invert the matrix
Hi = inv(vpa(H))

% Create a larger matrix
H2 = sym(hilb(80))

% Invert the larger matrix
H2i = inv(vpa(H2))

% Execute a function
Func(x, y)
```

Performance Evaluation Window

Technical Computing Environment (TCE 220)

File  Edit  Tools  View  Execute

Code Editor Window

725 → load('ball.mat')
730 → plot(ball)

H = sym(hilb(5))

Hi = inv(vpa(H))

H2 = sym(hilb(80))

H2i = inv(vpa(H2))

Func(x, y)

Performance Evaluation Window

▓▓▓ = Currently Executing

735 → Execution time = 10 ms
Resource consumption = 3 MB RAM

TECHNICAL COMPUTING ENVIRONMENT (TCE 220)

File　Edit　Tools　View　Execute

Code Editor Window

① load('ball.mat')
② plot(ball)
③ H = sym(hilb(5))
④ Hi = inv(vpa(H))
⑤ H2 = sym(hilb(8
⑥ H2i = inv(vpa(H2))
⑦ Func(x, y)

Performance Evaluation Window

▓▓▓ = Currently Executing

1. Execution time = 10 ms
   Resource consumption = 3 MB RAM

2. Execution time = 15 ms
   Resource consumption = 3 MB RAM

3. Execution time = 500 ms
   Resource consumption = 150 MB RAM

4. Execution time = 1000 ms
   Resource consumption = 300 MB RAM

5. Execution time = 750 ms
   Resource consumption = 225 MB RAM

6. Execution time = 5000 ms
   Resource consumption = 1.5 GB RAM

7. Execution time = 300 ms
   Resource consumption = 75 MB RAM

Performance Evaluation Options Window

Highlight Code:
☐ That uses more than ☐ MB RAM
☒ That takes 600 ms to execute

765

[OK]　[CANCEL]

FIG. 7G

Figure 8B:
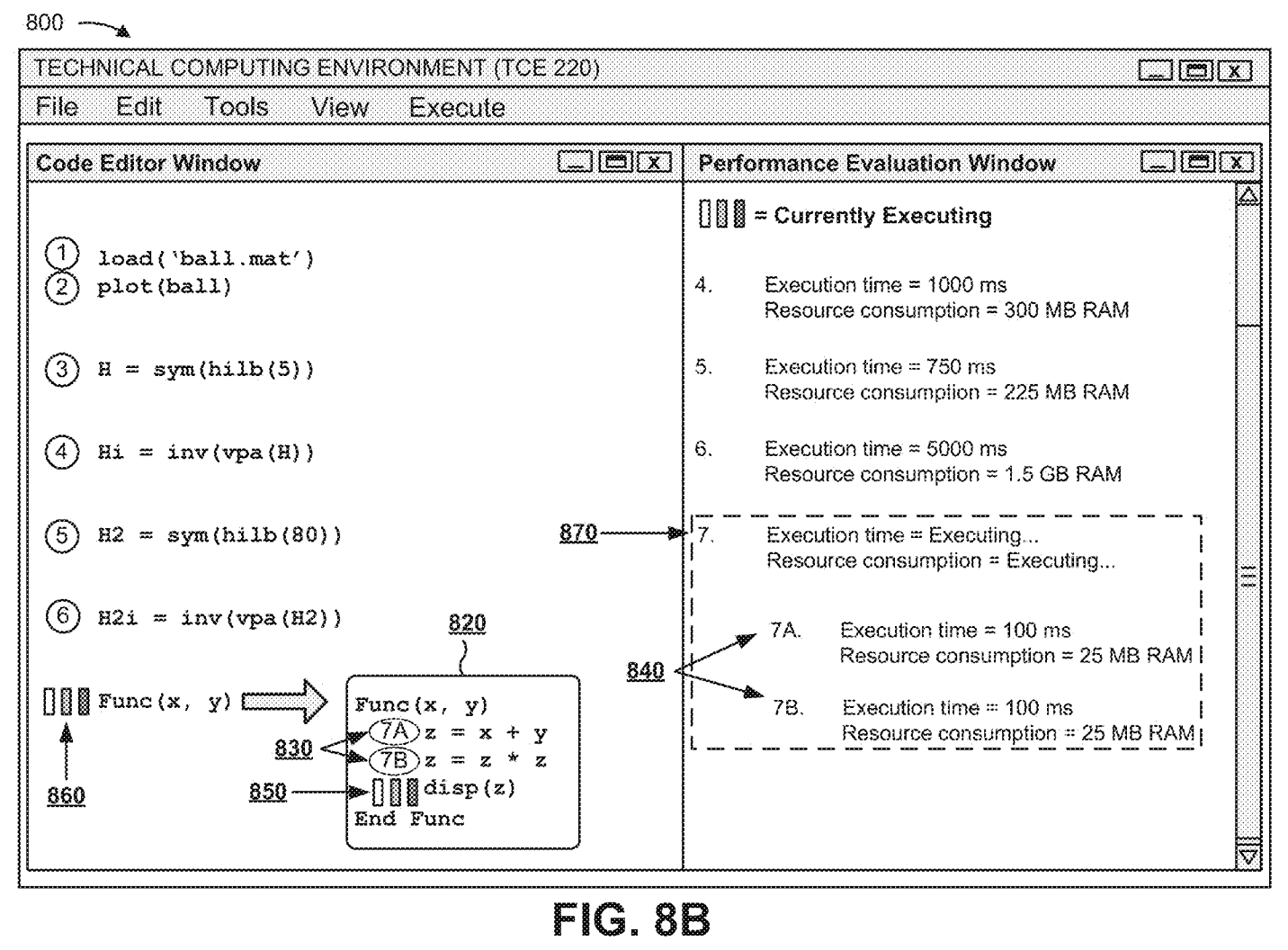

Technical Computing Environment (TCE 220)

File  Edit  Tools  View  Execute

Code Editor Window

1. load('ball.mat')
2. plot(ball)
3. H = sym(hilb(5))
4. Hi = inv(vpa(H))
5. H2 = sym(hilb(80))
6. H2i = inv(vpa(H2))
7. Func(x, y)

```
Func(x, y)
7A  z = x + y
7B  z = z * z
    disp(z)
End Func
```
820
830
850
860

Performance Evaluation Window

▓▓▓ = Currently Executing

4. Execution time = 1000 ms
   Resource consumption = 300 MB RAM

5. Execution time = 750 ms
   Resource consumption = 225 MB RAM

6. Execution time = 5000 ms
   Resource consumption = 1.5 GB RAM

7. Execution time = Executing...
   Resource consumption = Executing...

7A. Execution time = 100 ms
       Resource consumption = 25 MB RAM

7B. Execution time = 100 ms
       Resource consumption = 25 MB RAM 840
870

TECHNICAL COMPUTING ENVIRONMENT (TCE 220)

File  Edit  Tools  View  Execute

Code Editor Window

Performance Evaluation Window

▦ = Currently Executing in C++

⟲ = Currently Executing in Java 1030
load('ball.mat')
plot(ball)
H = sym(hilb(5))
Hi = inv(vpa(H))
H2 = sym(hilb(80))
H2i = inv(vpa(H2))
Func(x, y)

1020
1000

TECHNICAL COMPUTING ENVIRONMENT (TCE 220)

File  Edit  Tools  View  Execute

Code Editor Window

① load('ball.mat')
② plot(ball)
③ H = sym(hilb(5))
④ Hi = inv(vpa(H))
⑤ H2 = sym(hilb(80))
⑥ H2i = inv(vpa(H2))
⑦ Func(x, y)

1070

Performance Evaluation Window

▦ = Currently Executing in C++
↻ = Currently Executing in Java

Execution complete!
Total C++ Execution time: 7000 ms
Total Java Execution time: 9000ms

Technical Computing Environment (TCE 220)
File  Edit  Tools  View  Execute

Code Editor Window 1. load('ball.mat')
2. plot(ball)
3. H = sym(hilb(5))
   Hi = inv(vpa(H))    1150
   H2 = sym(hilb(80))  1140
   H2i = inv(vpa(H2))

Func(x, y)

1160

Performance Evaluation Window

▦ = Currently Executing on Processor A
◯ = Currently Executing on Processor B

1. Processor A time = 8 ms
2. Processor A time = 10 ms
3. Processor B time = 15 ms

FIG. 11C

USER INTERFACE DRIVEN REAL-TIME PERFORMANCE EVALUATION OF PROGRAM CODE

BRIEF DESCRIPTION OF THE DRAWINGS

FIG. 4 is a flow chart of an example process for receiving input options that control a live performance evaluation of program code execution;

FIGS. 5A-5E are diagrams of an example implementation relating to the example process shown in FIG. 4;

FIGS. 7A-7H are diagrams of an example implementation relating to the example process shown in FIG. 6;

FIGS. 8A and 8B are diagrams of another example implementation relating to the example process shown in FIG. 6;

FIGS. 10A-10D are diagrams of another example implementation relating to the example process shown in FIG. 6; and FIG. 11A-11C are diagrams of another example implementation relating to the example process shown in FIG. 6.

DETAILED DESCRIPTION

The following detailed description of example implementations refers to the accompanying drawings. The same reference numbers in different drawings may identify the same or similar elements.

A user, such as a computer programmer, may want to measure performance characteristics of different portions of program code included in a program. For example, the user may want to measure an amount of time that it takes a program code portion to execute, an amount of computing resources consumed by execution of a program code portion, or the like. Using these measurements, the user can improve a program by discovering problematic program code portions (e.g., program code portions that take a long time to execute, that consume a large amount of resources, etc.). The user may also want to measure these performance characteristics while a program is executing or while the user is editing the program code, so that the user can halt program execution to fix problems rather than waiting for the entire program to execute. Implementations described herein may assist a user in measuring performance characteristics, associated with program code execution, while the program code is executing, or in real-time while the user is editing the program code.

Figure 1A:
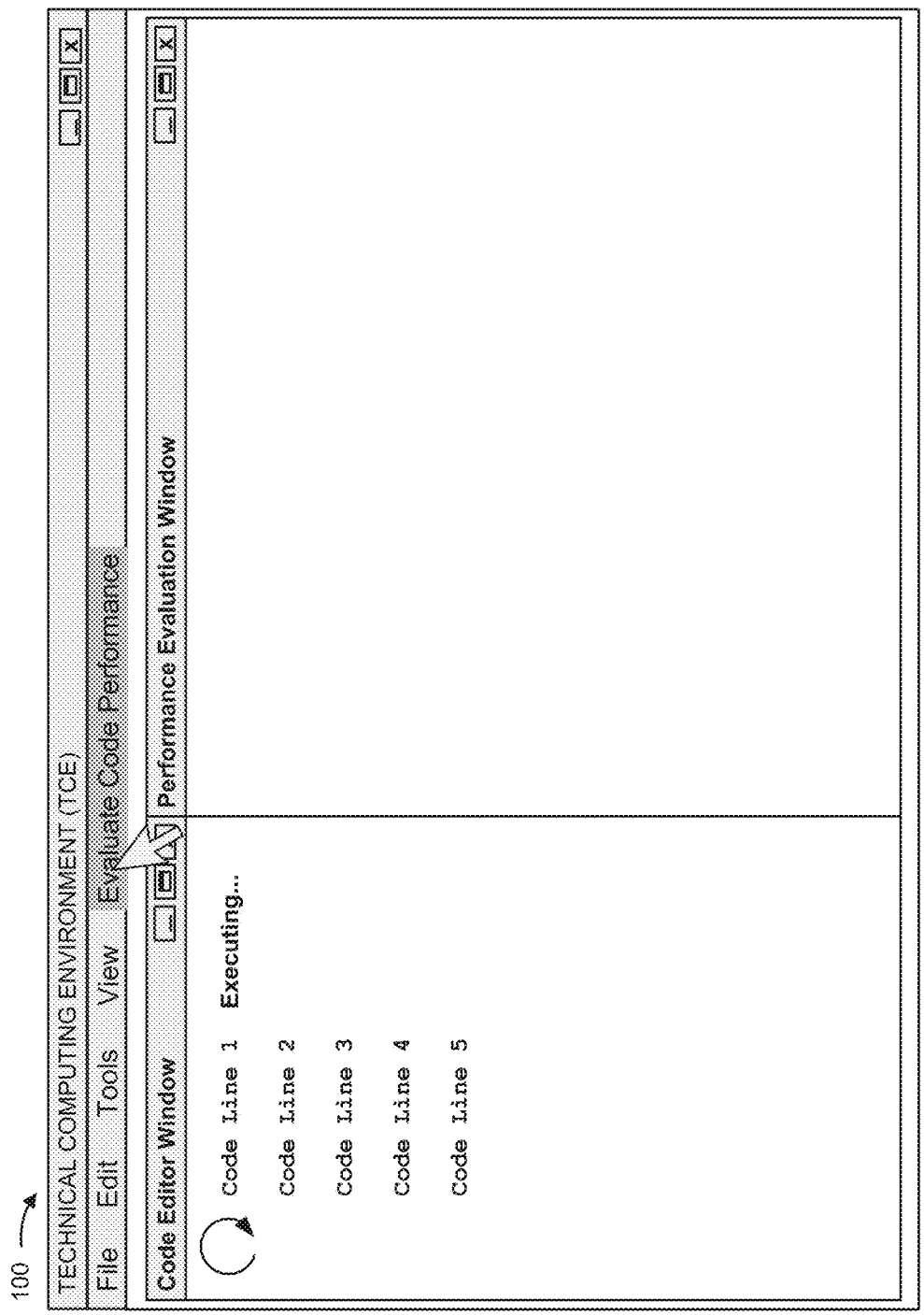
FIGS. 1A-1C are diagrams of an overview of an example implementation described herein.
Figure 1B:
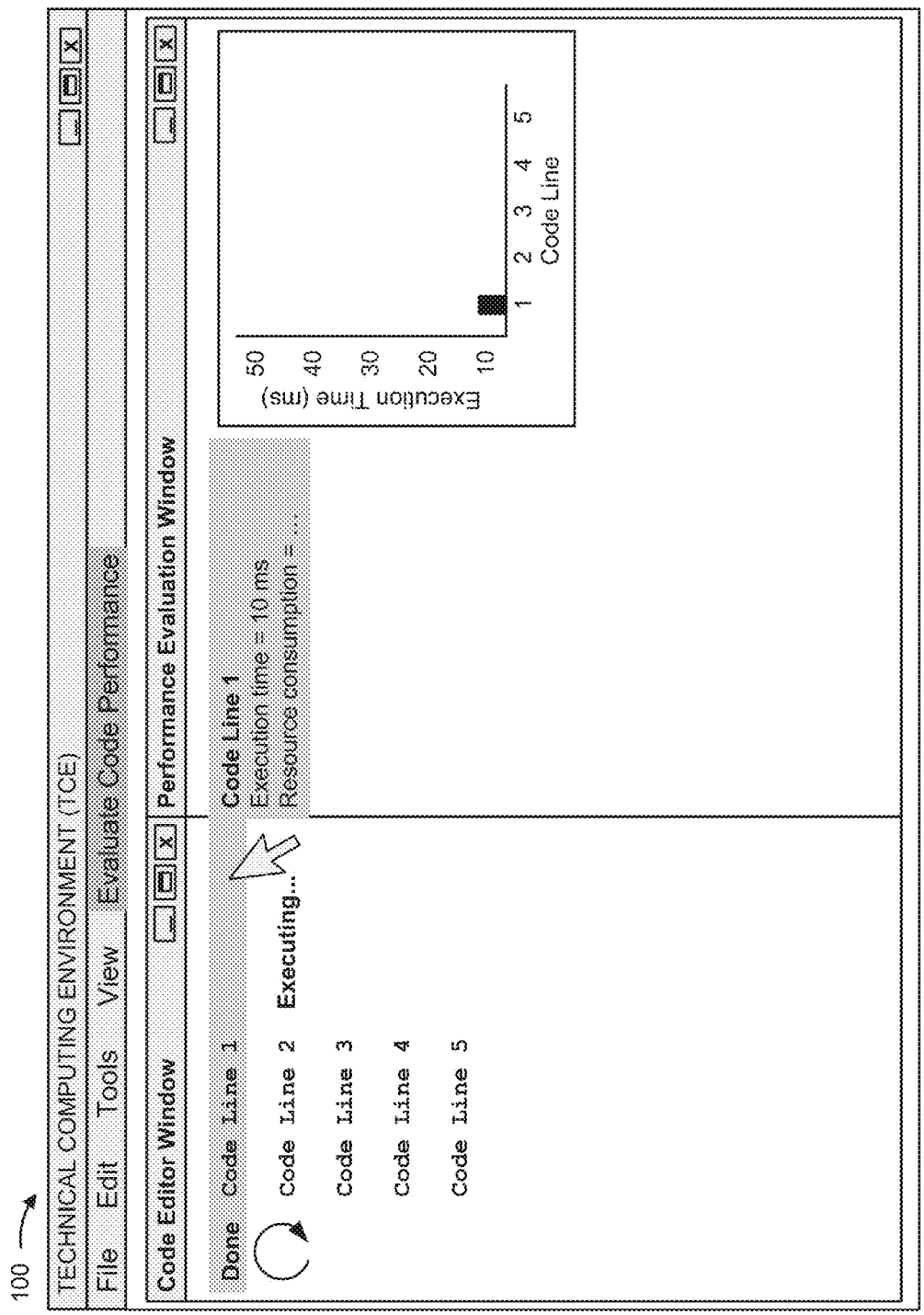
Figure 1C:
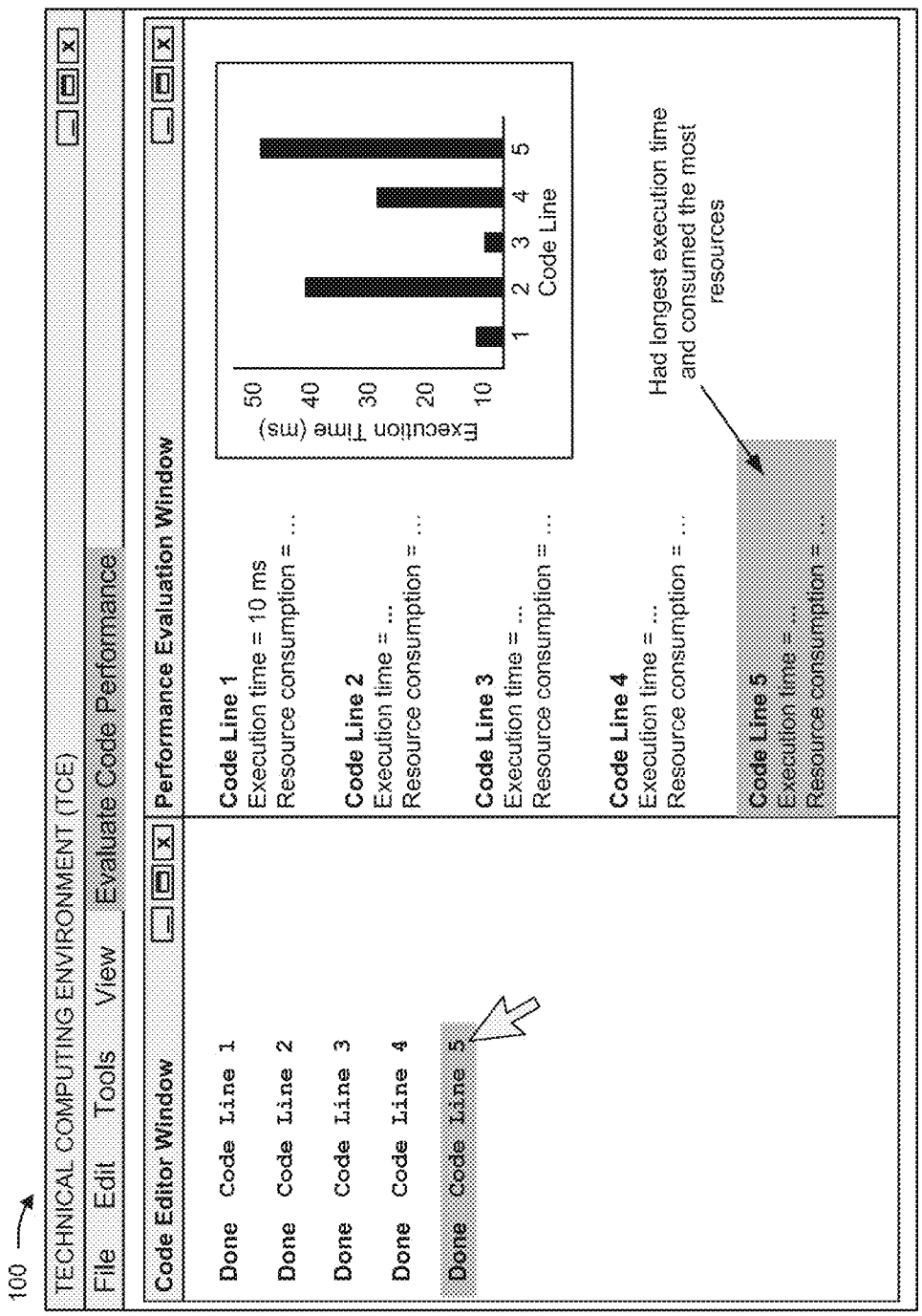

FIGS. 1A-1C are diagrams of an overview of an example implementation 100 described herein. As shown in FIG. 1A, assume that a user interacts with a technical computing environment (TCE), such as a computer programming environment, that is executing on a client device. Further, assume that the user interacts with the TCE, using a code editor window, to input multiple portions of program code, shown as Code Lines 1 through 5. As further shown, assume that the user interacts with an input mechanism, shown as an "Evaluate Code Performance" menu item, to cause the client device to perform a live evaluation of program code performance.

Based on the user interaction, the client device partitions the program code into program code portions, and begins executing a first program code portion, shown as Code Line 1. The client device may provide an indication that Code Line 1 is executing (e.g., shown as a circular arrow and the text "Executing" on Code Line 1).

As shown in FIG. 1B, assume that the client device finishes executing Code Line 1, and provides an indication that Code Line 1 has finished executing (e.g., shown as the text "Done" on Code Line 1). The client device may determine performance characteristics associated with the execution of Code Line 1, and may provide the performance characteristics for display. For example, as shown, the client device may provide an indication of an amount of time required for Code Line 1 to execute and an amount of resources consumed by executing Code Line 1. As further shown, the client device may provide a graphical depiction (e.g., a plot, a bar chart, a pie graph, etc.) that represents an execution time and/or an amount of resources consumed by executing Code Line 1. As further shown, assume that the client device begins executing a second program code portion, shown as Code Line 2. The client device may provide an indication that Code Line 2 is executing (e.g., shown as a circular arrow and the text "Executing" on Code Line 2).

As shown in FIG. 1C, the client device may continue executing the partitioned program code in this manner, with performance characteristics associated with a particular program code portion being provided for display (e.g., via a textual depiction and/or a graphical depiction) upon execution of the program code portion, and an indication of a currently-executing program code portion being provided for display. The client device may further provide an indication of problematic program code portions, such as a program code portion that had the longest execution time and/or that consumed the most resources as compared to other program code portions included in the program. In this way, a user may discover problems with a program and/or may learn about a program so that the user may improve the program.

Figure 2:
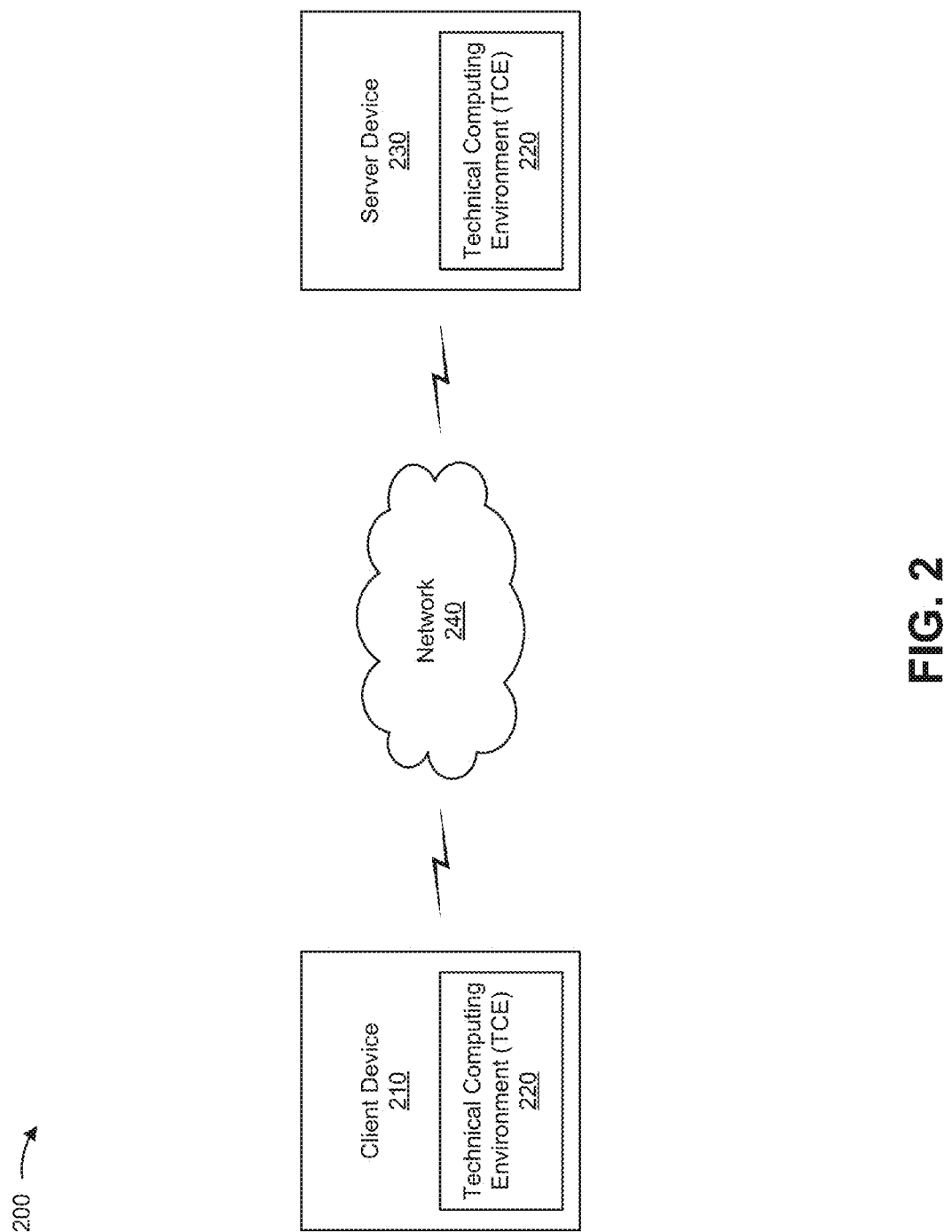
FIG. 2 is a diagram of an example environment in which system and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., a performance characteristic, information associated with a performance evaluation, etc.). For example, client device 210 may include a computing device, such as a desktop computer, a laptop computer, a tablet computer, a mobile phone (e.g., a smart phone, a radiotelephone, etc.), or a similar device. Client device 210 may evaluate program code performance by, for example, executing the program code and measuring a performance characteristic associated with program code execution. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). Additionally, or alternatively, TCE 220 may include a user interface that provides a performance evaluation portion that provides a performance characteristic corresponding to program code provided in the code editor portion.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute and/or evaluate program code (e.g., serially or in parallel), and may provide respective results of evaluating the program code to client device 210. Additionally, or alternatively, one or more server devices 230 may be used to store performance characteristics associated with one or more portions of program code.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
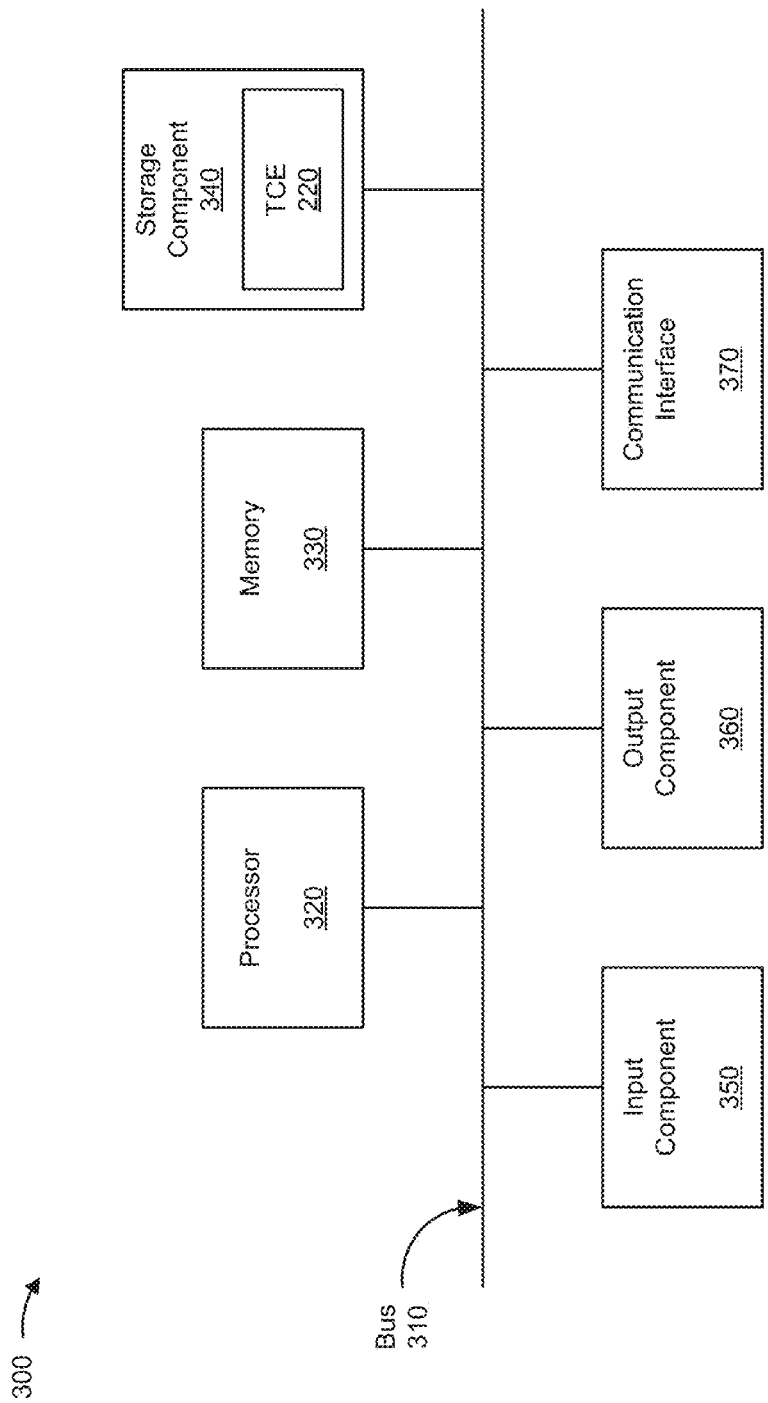
FIG. 3 is a diagram of example components of one or more devices of FIG. 2.

FIG. 3 is a diagram of example components of a device 300, which may correspond to client device 210 and/or server device 230. In some implementations, client device 210 and/or or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture, such as ARM, x86, etc.), and/or that is designed to implement one or more computing tasks. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), etc.

Device 300 may perform one or more processes described herein. Device 300 may perform these processes in response to processor 320 executing software instructions included in a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for receiving input options that control a live performance evaluation of program code execution. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving an indication to evaluate performance of program code execution (block 410). For example, client device 210 may receive (e.g., via user input and/or input from another device) an indication to evaluate performance of program code execution. In some implementations, a user may interact with a user interface, provided via TCE 220 executing on client device 210, to provide input to evaluate performance of program code execution. In some implementations, the user may provide input to toggle between evaluating performance and executing program code without evaluating performance.

Program code (sometimes referred to herein as code) is to be broadly interpreted to include text-based code that may not require further processing to execute (e.g., C++ code, Hardware Description Language (HDL) code, very-high-speed integrated circuits (VHSIC) HDL (VHDL) code, Verilog code, Java code, another type of hardware and/or software based code that may be compiled and/or synthesized, etc.), binary code that may be executed (e.g., executable files that may be directly executed by an operating system, bitstream files that may be used to configure an FPGA, Java byte code, object files combined together with linker directives, source code, makefiles, etc.), text files that may be executed in conjunction with other executables (e.g., Python text files, Octave files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like.

In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, a graphical entity, etc.

As further shown in FIG. 4, process 400 may include determining an execution parameter that controls a manner in which the program code is executed to evaluate performance (block 420). For example, client device 210 may determine an execution parameter based on user input and/or input received from another device. The execution parameter may control a manner in which the program code is executed to evaluate performance.

The execution parameter may include a partition parameter that specifies a manner in which the program code is to be partitioned, in some implementations. For example, client device 210 may partition the program code into different portions. A portion of program code (sometimes referred to herein as a program code portion) may refer to a portion of a program, such as one or more lines of program code, a string of one or more characters of program code, a set of strings of program code, a block of program code, a function, a method, a script, an object, or the like. The partition parameter may specify a level at which the program code is to be partitioned, such as a line level, a function level, a block level, etc.

In some implementations, the execution parameter may specify an execution speed at which the program code is to be executed. For example, client device 210 may execute the program code at a normal speed (e.g., a default speed), a slower speed (e.g., a speed that is slower than the normal speed by a specified percentage), etc. By changing the execution speed, a user may be able to more easily determine problematic program code portions. In some implementations, a user may select to execute program code using a relative speed mode. In the relative speed mode, client device 210 may ensure that each program code portion takes at least a threshold amount of time to execute.

As an example, assume that client device 210 partitions a program into a first portion and a second portion. Further, assume that the first portion takes 1 millisecond to execute, and the second portion takes 299 milliseconds to execute. If client device 210 provides an execution indicator that indicates when each portion is being executed, the execution indicators for the first portion and the second portion may appear and disappear so quickly that the user cannot determine the relative execution time for each portion. By slowing down execution, such as where 1 millisecond is set equal to 1 second, the user may be able to see the relative execution speeds of the different portions because an execution indicator for the first portion may be displayed for 1 second, and the execution indicator for the second portion may be displayed for 299 seconds, which gives the user enough time to see and compare the length of time that each execution indicator is provided for display (e.g., whereas execution indicators that are displayed for 1 millisecond and 299 milliseconds may flash on a display too quickly for a user to see and compare).

In some implementations, a user may adjust an execution speed while a program is being executed. For example, the first program code portion described above may be executed, and client device 210 may display an execution indicator for 1 second. The user may not want to wait 299 seconds for client device 210 to execute the second program code portion, and may increase the execution speed while client device 210 is executing the second program code portion. As an example, the user may interact with an input mechanism, such as a slider bar, to adjust the execution speed. Additionally, or alternatively, the user may specify different execution speeds for different portions of program code.

In some implementations, the execution parameter may specify a target programming language for which client device 210 is to evaluate performance of the code. For example, a user may specify a target programming language, and client device 210 may generate target code, in the target programming language, from input code (e.g., code provided via a code editor window). Client device 210 may execute the target code, and may provide a performance characteristic associated with the target code. The target code may include, for example C code, C++ code, Java code, Python code, MATLAB code, another type of program code, etc.

In some implementations, the execution parameter may specify a target system that client device 210 is to simulate to evaluate performance of the program code on the target system. For example, a user may specify one or more system parameters of a target system on which the program code is to be executed. A system parameter may include, for example, an amount of processing power of the target system, an amount of memory on the target system, an amount of disk space on the target system, a particular type of processor (e.g., a CPU, a GPU, etc.), a particular type of memory, etc. Client device 210 may execute the program code using the specified system parameters, and may provide a performance characteristic associated with the program code execution.

As further shown in FIG. 4, process 400 may include determining a performance characteristic to be generated and/or provided for display (block 430). For example, client device 210 may determine a performance characteristic, associated with program code execution, to be generated. In some implementations, client device 210 may receive (e.g., based on user input and/or input from another device) information that identifies one or more performance characteristics to be generated.

A performance characteristic may include, for example, an indication that client device 210 is currently executing a program code portion, an indication that client device 210 has finished executing a program code portion, an amount of time that client device 210 takes to execute a program code portion (e.g., an amount of time between when client device 210 begins executing the code portion and when client device 210 finishes executing the code portion), an amount of computing resources consumed by client device 210 while executing a program code portion (e.g., an amount of processing power, an amount of memory, an amount of disk space, a quantity of processor cores used, etc.), or the like.

Additionally, or alternatively, the performance characteristic may indicate a quantity of times that a program code portion executed (e.g., within a single execution of a program and/or across multiple executions of the program), may identify a resource used by client device 210 as a result of executing the program code portion (e.g., whether program code execution caused client device 210 to use a GPU, a particular processor core, a particular hardware component, a particular software application, etc.), whether the program code portion may be used to generate target code in another programming language (e.g., C++, Java, etc.), a data type associated with the program code portion (e.g., an input data type, an output data type, etc.), other code associated with the program code portion (e.g., code called by the program code portion, code that calls the program code portion, etc.), a memory leak associated with a program code portion (e.g., whether execution of a program code portion caused a resource to remain allocated, an amount of the resource left allocated, etc.), etc.

Additionally, or alternatively, the performance characteristic may be generated based on a comparison between a particular program code portion and one or more other program code portions. For example, the performance characteristic may indicate a relative execution time of a program code portion as compared to other program code portions (e.g., an amount of time above or below an average execution time, a percentage above or below an average execution time), a relative amount of resources consumed by the program code portion as compared to other program code portions (e.g., an amount above or below an average amount, a percentage above or below an average amount, etc.), or the like.

As further shown in FIG. 4, process 400 may include determining an output trigger that indicates when the performance characteristic is to be provided for display (block 440). For example, client device 210 may determine an output trigger (e.g., based on user input and/or input received from another device). The output trigger may specify when the performance characteristic is to be provided for display. For example, client device 210 may display a performance indicator, associated with a particular program code portion, while client device 210 is executing the particular program code portion, after client device 210 finishes executing the particular program code portion, after client device 210 finishes executing all program code portions included in a program, etc.

In some implementations, client device 210 may provide a performance indicator for display after a breakpoint condition is satisfied. For example, a user may input one or more breakpoint conditions. When a breakpoint condition is satisfied, client device 210 may stop executing program code and/or may provide a performance characteristic for display. A breakpoint condition may be based on a performance characteristic and/or a threshold, in some implementations. For example, client device 210 may compare a performance characteristic to a threshold, and may determine that the breakpoint condition is satisfied when the performance characteristic satisfies the threshold.

As an example, a breakpoint condition may be satisfied when a particular program code portion is executed, when a particular program code portion generates a particular value (e.g., a variable value), when a performance characteristic of a program code portion satisfies a threshold (e.g., when more than a threshold quantity of resources are consumed by execution of the code portion, when execution of the code portion takes more than a threshold quantity of time, when execution of the code portion is a threshold percentage slower than an average execution time of other code portions, etc.), when execution of a program code portion causes a particular program code portion to be called, when execution of the program code portion causes a new thread and/or process to be created, when execution of the program code portion causes an additional processor and/or processor core to be allocated for the execution, when execution of the program code portion causes a particular file and/or application to be utilized (e.g., a particular dynamic link library file), when execution of the program code portion causes a data type to change (e.g., a data type associated with a function), when execution of the program code portion causes compiled code to be discarded (e.g., a memory flush due to the memory becoming full), etc.

Additionally, or alternatively, a breakpoint condition may be based on total execution of a program (e.g., up to a currently executing code portion) rather than execution of individual program code portions. For example, a breakpoint condition may be satisfied when total program execution takes a threshold amount of time, consumes a threshold amount of resources, etc.

As further shown in FIG. 4, process 400 may include determining a display parameter that indicates a manner in which the performance characteristic is to be provided for display (block 450). For example, client device 210 may determine a display parameter (e.g., based on user input and/or input from another device). The display parameter may specify a manner in which a performance characteristic is to be provided for display. For example, a display parameter may specify that client device 210 is to provide a performance characteristic in-line with a program code portion to which the performance characteristic relates, may specify that client device 210 is to provide a performance characteristic in a separate window than the program code, may specify that client device 210 is to provide an indication of a relationship between a particular program code portion and a particular performance characteristic, etc. Client device 210 may provide a performance characteristic for display based on the display parameter.

As further shown in FIG. 4, process 400 may include storing and/or providing information that identifies the execution parameter, the performance characteristic, the output trigger, and/or the display parameter (block 460). For example, client device 210 may store information that identifies the execution parameter, the performance characteristic, the output trigger, and/or the display parameter. Additionally, or alternatively, client device 210 may provide (e.g., to another device, such as server device 230) information that identifies the execution parameter, the performance characteristic, the output trigger, and/or the display parameter. In some implementations, client device 210 may associated these input options with information identifying a program and/or a program code portion to which the input options are to be applied. Client device 210 may store the information and/or provide the information for storage so that the information may be used when evaluating performance of program code execution, as described in more detail herein in connection with FIG. 6. In this way, client device 210 may perform the performance evaluation based on user-specified parameters.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show examples of receiving input (e.g., an execution parameter, a performance characteristic, an output trigger, and a display parameter) that controls a live performance evaluation of program code execution.

Figure 5B:
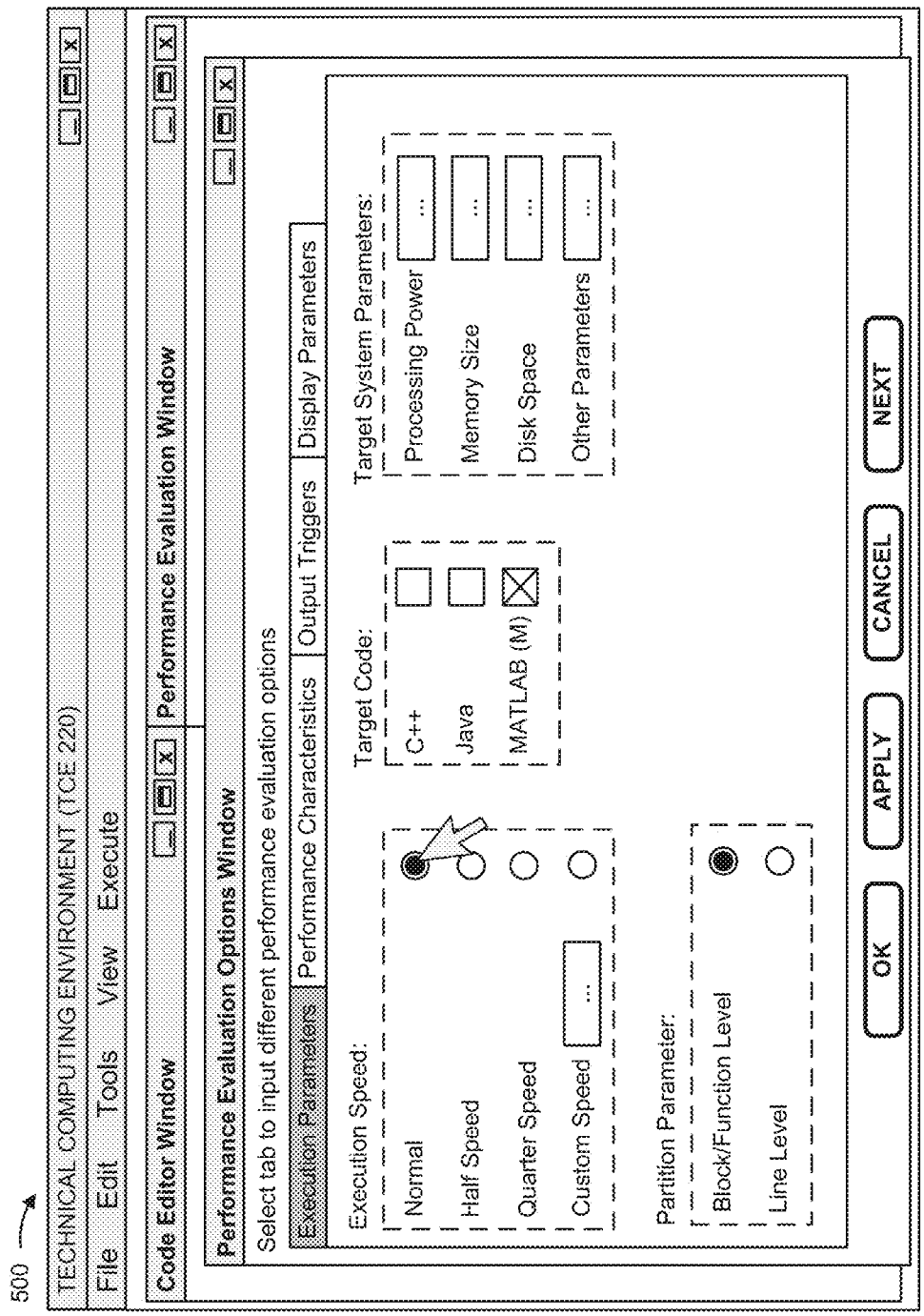

As shown in FIG. 5A, assume that a user interacts with a user interface of TCE 220, executing on client device 210, to provide input indicating that client device 210 is to evaluate performance of program code execution. As shown in FIG. 5B, based on the user interaction, client device 210 provides a performance evaluation options window that permits a user to input various options associated with the performance evaluation. As shown, the performance evaluation options window may permit the user to input one or more execution parameters, performance characteristics, output triggers, and/or display parameters.

FIG. 5B shows example execution parameters that a user may input. For example, the performance evaluation window may permit the user to specify an execution speed (e.g., normal, half speed, quarter speed, a custom speed, etc.), a partition parameter (e.g., block/function level partitioning, line level partitioning, etc.), target code (e.g., C++ code, Java code, MATLAB code, etc.), target system parameters (e.g., processing power, memory size, disk space, etc.), or the like. As shown, assume that the user selects to execute the program code at normal speed, selects to partition the program code at the block/function level, specifies MATLAB code as the target code, and does not specify any target system parameters.

Figure 5C:
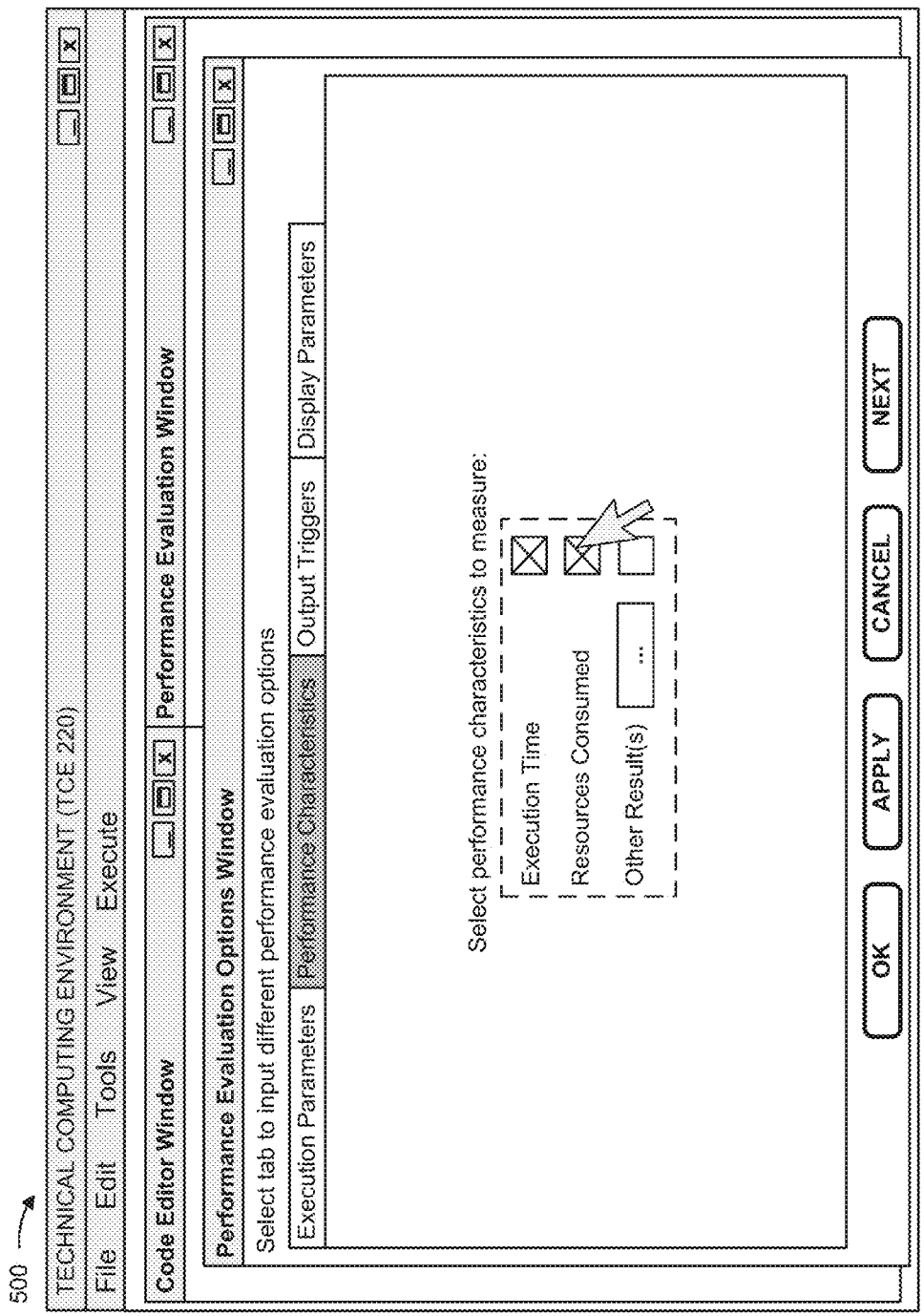

FIG. 5C shows example performance characteristics that a user may input to specify performance characteristics that client device 210 is to generate as part of the performance evaluation. For example, the performance evaluation window may permit the user to specify one or more performance characteristics for evaluation. As shown, assume that the user specifies execution time and resources consumed as the performance characteristics to be generated and provided for display by client device 210.

Figure 5D:
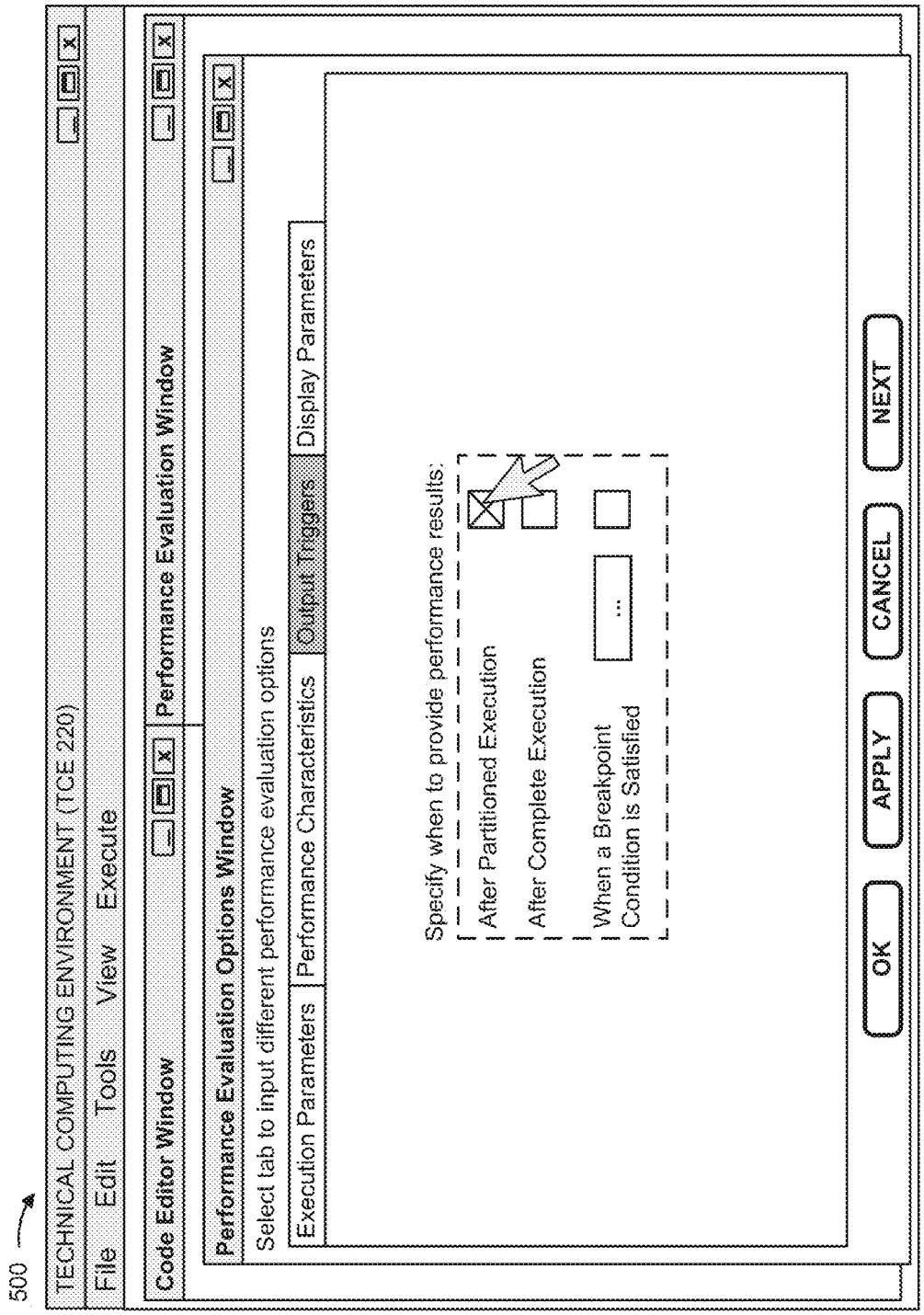

FIG. 5D shows example output triggers that a user may input. For example, the performance evaluation window may permit the user to specify that performance characteristics are to be provided for display after executing a partitioned portion of program code, after executing the entire program (e.g., all program code portions including the program), when a breakpoint condition is satisfied, etc. As shown, assume that the user indicates that client device 210 is to provide a performance characteristic after executing a program code portion.

Figure 5E:
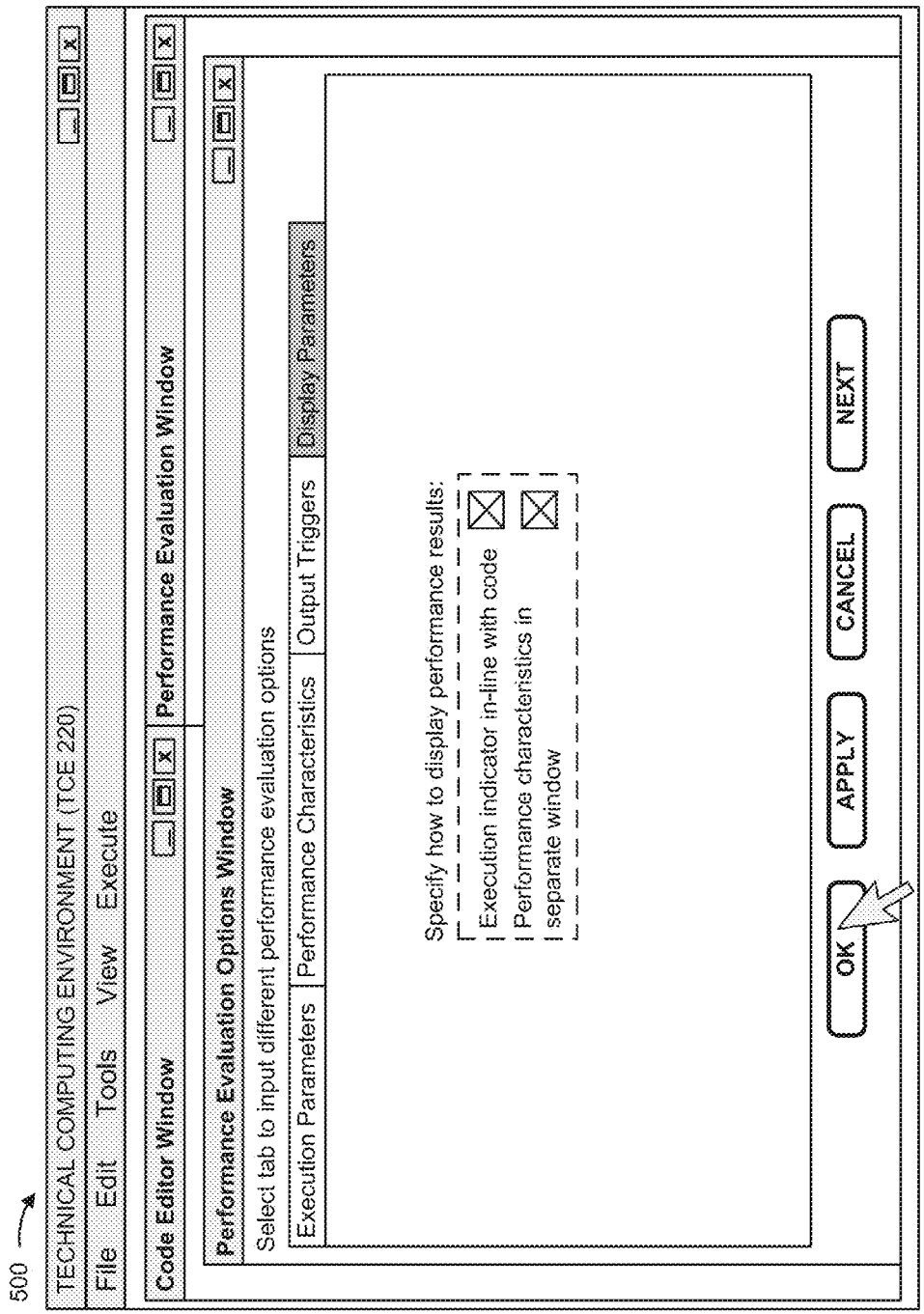

FIG. 5E shows example display parameters that a user may input. For example, the performance evaluation window may permit the user to specify how different performance characteristics are to be provided for display. As shown, assume that the user specifies to display an execution indicator in-line with code, and to display performance characteristics in a window that is separate from a code editor window that provides the program code for display.

As indicated above, FIGS. 5A-5E are provided merely as an example. Other examples are possible and may differ from what was described with regard to FIGS. 5A-5E.

Figure 6:
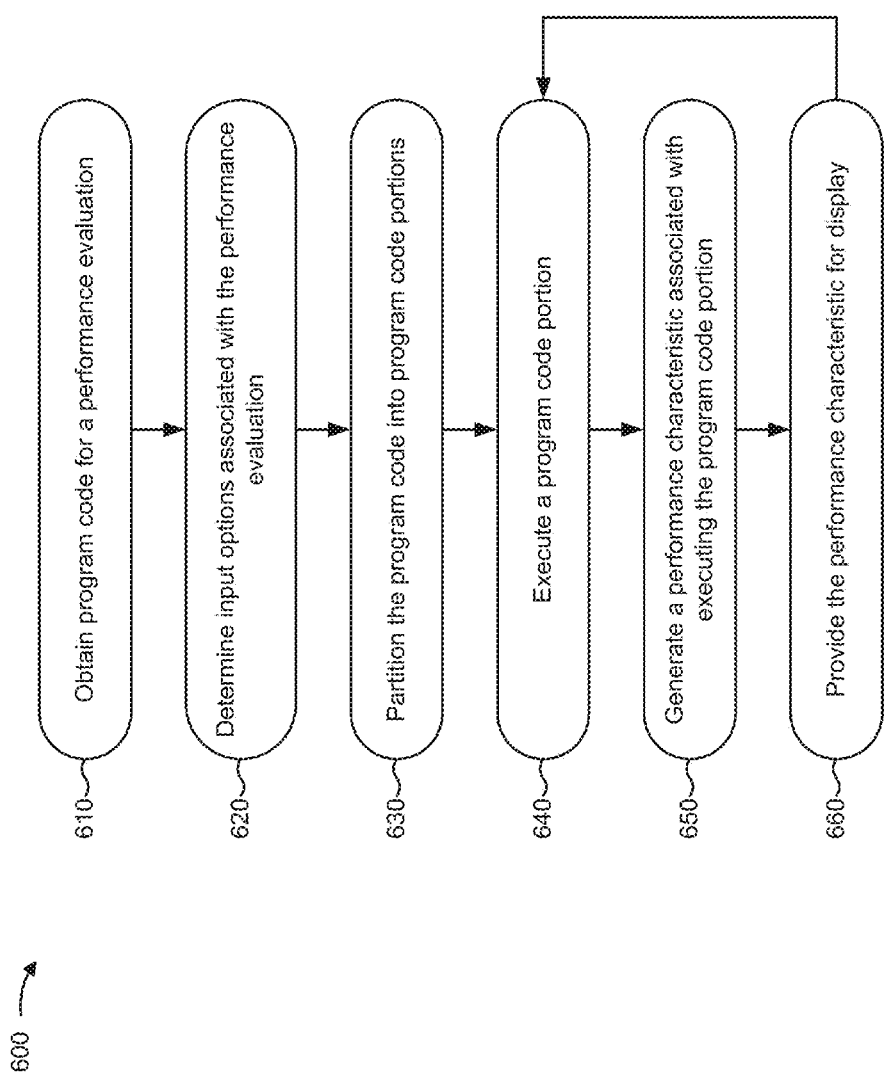
FIG. 6 is a flow chart of an example process for performing a live performance evaluation of program code execution.

FIG. 6 is a flow chart of an example process 600 for performing a live performance evaluation of program code execution. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include obtaining program code for a performance evaluation (block 610). For example, client device 210 may obtain program code. In some implementations, a user may input information identifying the program code or a memory location at which the program code is stored (e.g., local to and/or remote from client device 210). Based on the user input, client device 210 may retrieve the program code. Additionally, or alternatively, client device 210 may provide a user interface (e.g., via TCE 220) via which a user may input program code, and client device 210 may obtain the input program code via the user interface.

As further shown in FIG. 6, process 600 may include determining input options associated with the performance evaluation (block 620). For example, client device 210 may determine one or more input options associated with the performance evaluation. An input option may include, for example, an execution parameter, a performance characteristic, an output trigger, and/or a display parameter. Client device 210 may determine the input options based on information identifying the program code to which the input options are to be applied. In some implementations, client device 210 may obtain the input options from a memory accessible by client device 210. Additionally, or alternatively, client device 210 may receive the input options from server device 230. Client device 210 may determine an input option as described herein in connection with FIG. 4.

As further shown in FIG. 6, process 600 may include partitioning the program code into program code portions (block 630). For example, client device 210 may partition the program code into different portions, such as one or more lines of program code, a string of one or more characters of program code, a set of strings of program code, a block of program code, a function, a method, a script, an object, or the like. In some implementations, client device 210 may partition the program code based on a partition parameter (e.g., specified by a user via an input option).

As further shown in FIG. 6, process 600 may include executing a program code portion (block 640). For example, client device 210 may execute the program code portion (e.g., to determine an execution result). In some implementations, client device 210 may execute the program code portion by executing the program code portion locally (e.g., by client device 210) and/or by providing the program code portion to another device (e.g., server device 230) for execution. In some implementations, client device 210 may execute the program code portion based on an execution parameter (e.g., specified by a user via an input option).

Client device 210 may provide an execution indicator that indicates when a particular portion of program code is currently executing. For example, client device 210 may provide an execution indicator next to a particular program code portion while client device 210 is executing the particular program code portion. The execution indicator may indicate that client device 210 is executing the particular program code portion. In some implementations, client device 210 may provide the execution indicator after the program code portion has been executing for a threshold amount of time, to avoid rapid flashing of the execution indicator when a program code portion is executed quickly.

Additionally, or alternatively, client device 210 may provide an indicator next to a particular program code portion when client device 210 has finished executing the particular program code portion. This indicator may indicate that client device 210 has finished executing the particular program code portion. In this way, a user may be able to determine a portion of a program that is currently executing and/or a portion of a program that has finished executing.

In some implementations, client device 210 may generate target code from input code, and may provide different execution indicators that indicate a currently-executing portion of target code (e.g., generated based on a portion of input code) and a currently-executing portion of input code. Additionally, or alternatively, client device 210 may generate multiple versions of target code (e.g., associated with different programming languages), and may provide different execution indicators that indicate a currently-executing portion of first target code (e.g., generated based on a portion of input code), a currently-executing portion of second target code, etc.

As further shown in FIG. 6, process 600 may include generating a performance characteristic associated with executing the program code portion (block 650). For example, client device 210 may generate and/or measure a performance characteristic based on executing the program code portion. In some implementations, client device 210 may determine a performance characteristic identified via an input option (e.g., input by a user).

As further shown in FIG. 6, process 600 may include providing the performance characteristic for display (block 660). For example, client device 210 may provide the determined performance characteristic for display via a user interface of client device 210. In some implementations, client device 210 may provide the performance characteristic based on determining that an output trigger has been triggered (e.g., that one or more output conditions are satisfied). Additionally, or alternatively, client device 210 may provide the performance characteristic based on a display parameter (e.g., specified by a user via an input option).

Client device 210 may continue executing partitioned program code portions, generating respective performance characteristics associated with executing the partitioned program code portions, and providing the respective performance characteristics for display. Client device 210 may proceed in this manner until all of the partitioned program code portions have been executed and/or until a breakpoint condition has been satisfied.

In some implementations, client device 210 may compare performance characteristics associated with different program code portions, and may provide an indicator based on the comparison. For example, client device 210 may provide an indication of program code portions associated with a performance characteristic that satisfies a threshold, that satisfies a condition, etc. As an example, client device 210 may provide an indication of a program code portion that took the longest time to execute when compared to other program code portions that were executed. In this way, client device 210 may perform a live performance evaluation of program code, and a user may use the performance evaluation to determine whether to make changes to program code.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7H are diagrams of an example implementation 700 relating to example process 600 shown in FIG. 6. FIGS. 7A-7H show an example of performing a live performance evaluation of program code execution.

Figure 7B:
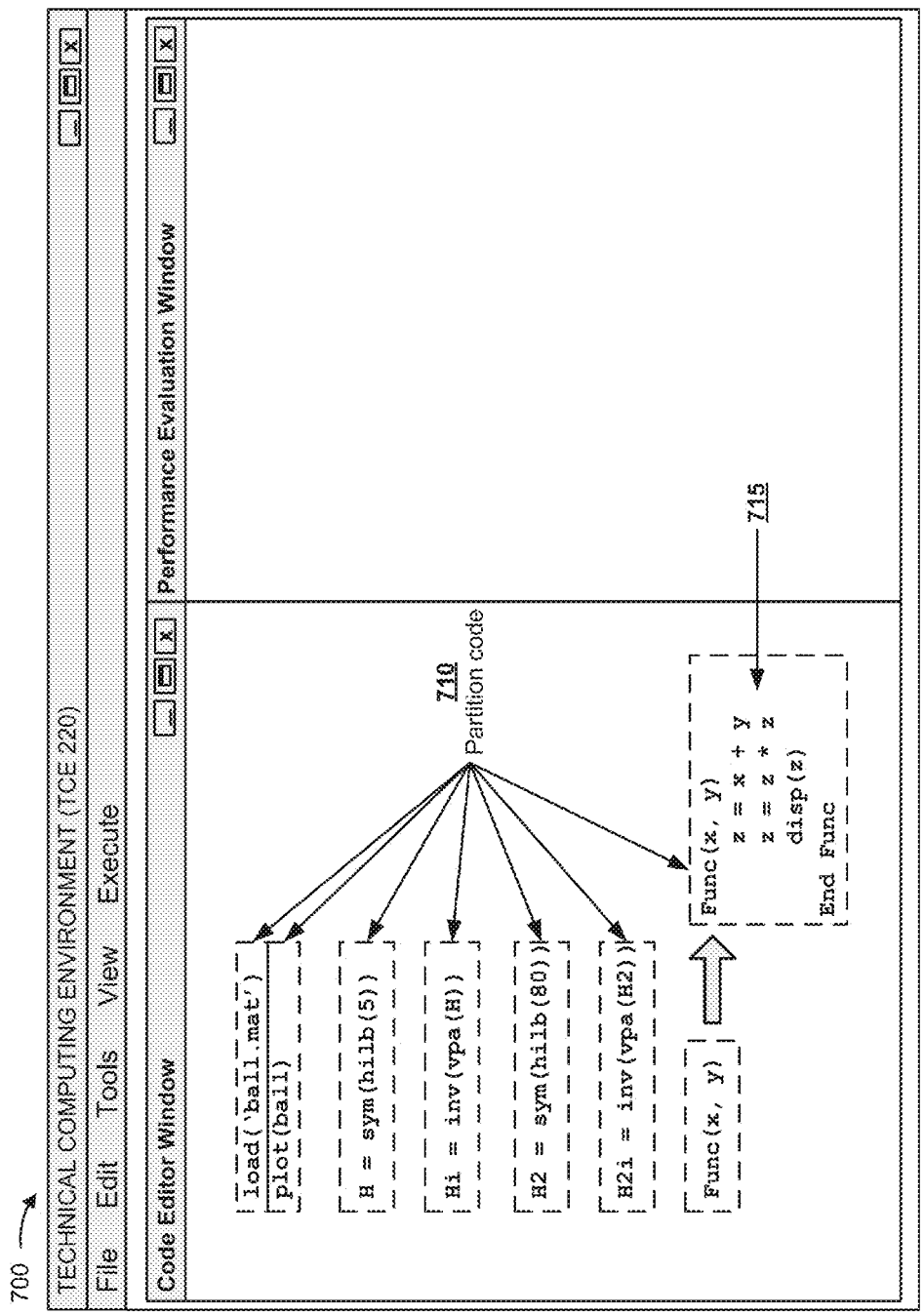

For the purpose of FIGS. 7A-7H, assume that at a previous point in time, the user provided the input options described herein in connection with FIGS. 5A-5E. As shown in FIG. 7A, assume that the user has input program code into a code editor window of TCE 220, which is executing on client device 210. For example, assume that the user has input the following code:

load('ball.mat')
plot(ball)
H=sym(hilb(5))
Hi=inv(vpa(H))
H2=sym(hilb(80))
H2i=inv(vpa(H2))
Func(x, y).

As further shown in FIG. 7A, and as shown by reference number 705, assume that the user interacts with an input mechanism, provided via the user interface, that causes client device 210 to execute the program code and evaluate performance of the execution.

As shown in FIG. 7B, and by reference number 710, assume that the user interaction causes client device 210 to partition the program code. Assume that client device 210 partitions the program code based on an input option (e.g., a partition parameter), such that each line of program code, respectively corresponding to the load command, the plot command, the calculation of H, the calculation of H1, the calculation of H2, the calculation of H2i, and the performance of the Func function, are partitioned separately. Assume that the user has input an option to partition code at the function level, and thus the program code included in the Func function is included in a single program code partition, as shown by reference number 715.

Figure 7C:
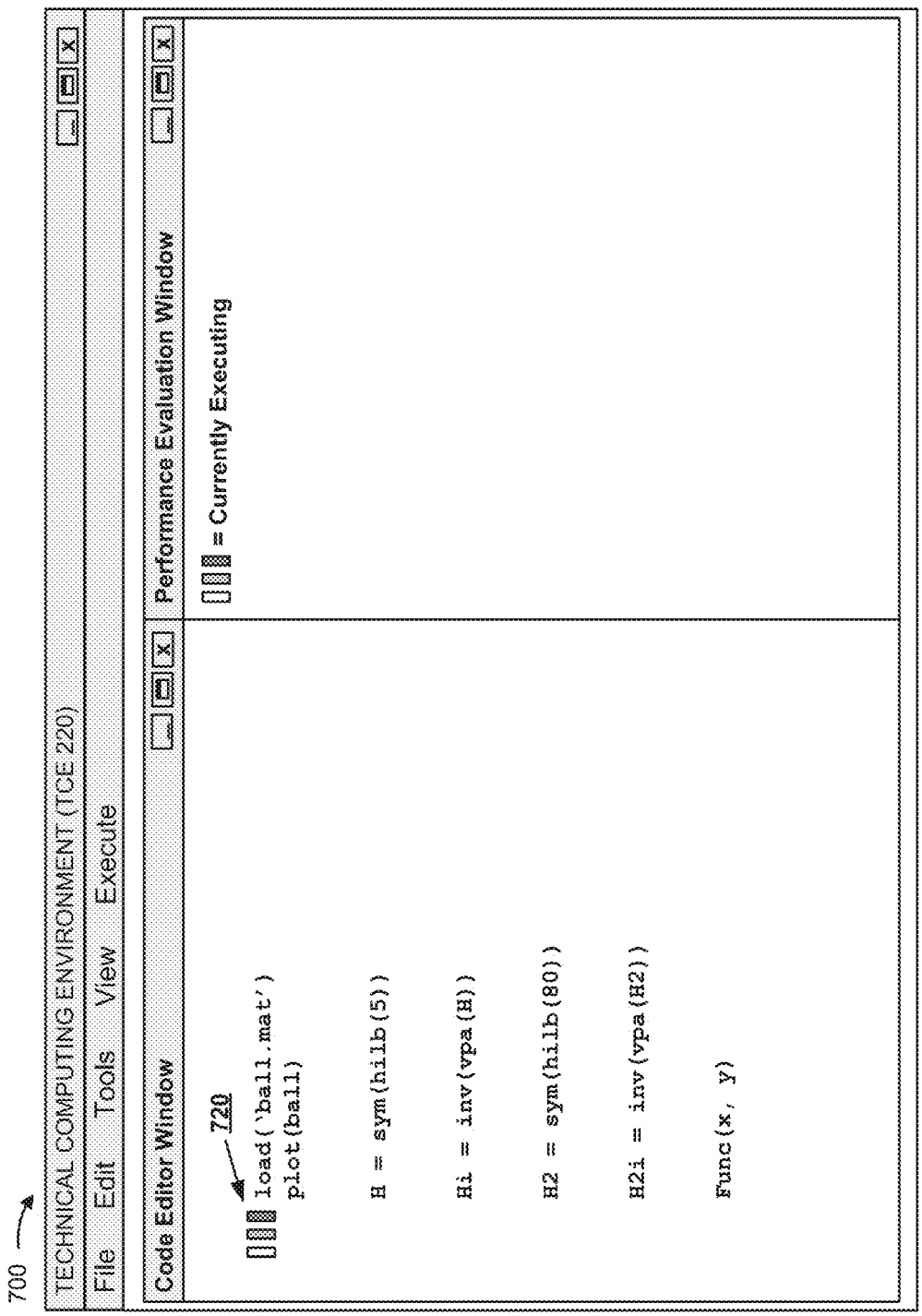

As shown in FIG. 7C, assume that client device 210 begins executing the partitioned program code, beginning with a first partition shown as load('ball.mat'). As shown by reference number 720, client device 210 displays an execution indicator (e.g., based on an input option) next to load('ball.mat') to indicate that client device 210 is currently executing this portion of program code. Assume that the execution indicator is a repeating animation of three bars, with successively darker colors, that appear from left to right, as shown.

As shown in FIG. 7D, assume that client device 210 finishes executing the first partition, load('ball.mat'), and begins executing a second partition, shown as plot(ball). As shown by reference number 725, client device 210 displays an indication that the first partition has finished executing (e.g., based on an execution option). As shown by reference number 730, client device 210 displays an execution indicator that indicates that the second partition is currently executing. As shown by reference number 735, client device 210 displays performance characteristics associated with execution of the first partition. For example, assume that the user has selected input options that cause client device 210 to measure and provide performance characteristics of execution time and memory consumption. As shown, client device 210 determines that the first partition executed in ten milliseconds (ms) and consumed three megabyte (MB) of random access memory (RAM), and provides these performance characteristics for display. Furthermore, client device 210 provides a correspondence indicator, shown as gray highlighting, that indicates a correspondence between the displayed performance characteristics and the first partition.

Figure 7E:
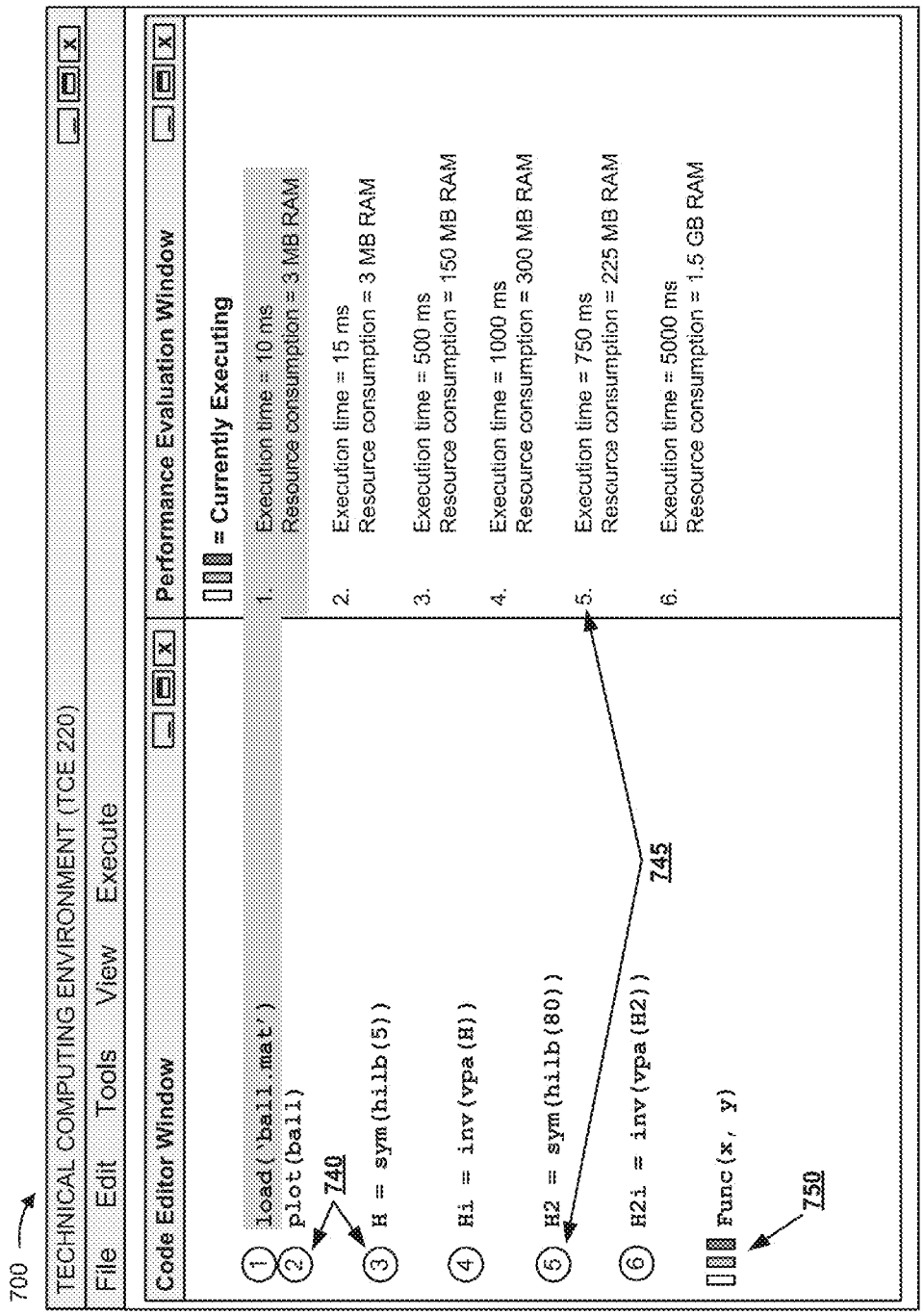

As shown in FIG. 7E, assume that client device 210 finishes executing the first six partitions (e.g., up through H2i=inv(vpa (H2))). Client device 210 provides an indication that these six partitions have finished executing, and further provides an indication of an order in which the partitions were executed, as shown by reference number 740. Furthermore, client device 210 measures and displays performance characteristics for each partition, and provides correspondence indicators that indicate a correspondence between each executed partition and corresponding performance characteristics, as shown by reference number 745. For example, client device 210 displays the same number next to a partition and corresponding performance characteristics. As shown by reference number 750, assume that client device 210 is currently executing a seventh partition, shown as Func(x, y).

Figure 7F:
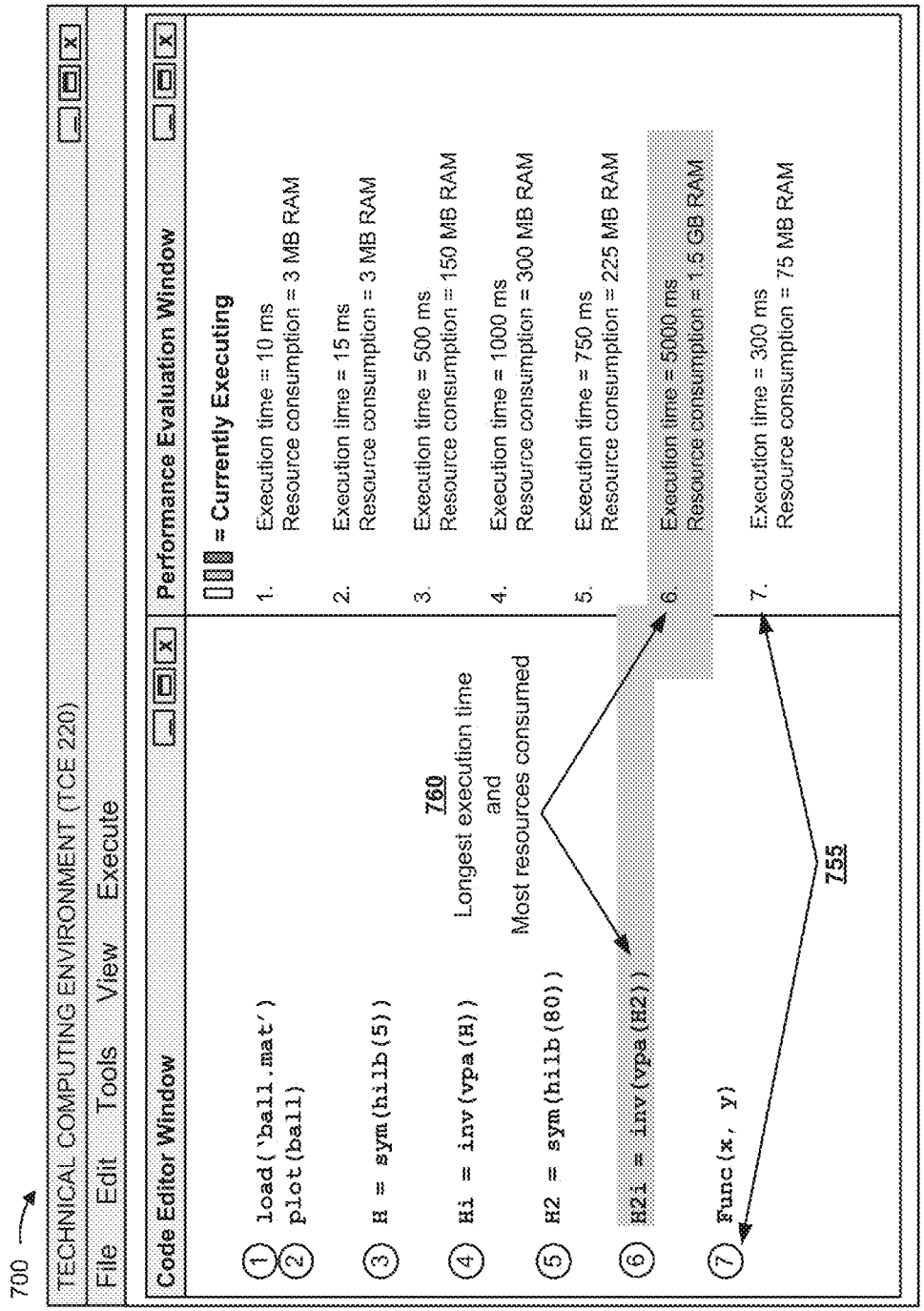

As shown in FIG. 7F, and by reference number 755, assume that client device 210 finishes executing the seventh partition, and then generates and displays performance characteristics associated with the seventh partition. As shown by reference number 760, after client device 210 has finished executing all partitions, client device 210 may compare performance characteristics associated with the different partitions, and may provide an indication of a partition that that took the longest time to execute, that consumed the most resources, etc. For example, client device 210 provides an indication that the sixth partition, shown as H2i=inv(vpa(H2)), had the longest execution time and consumed the most memory as compared to the other partitions in the program.

Figure 7H:
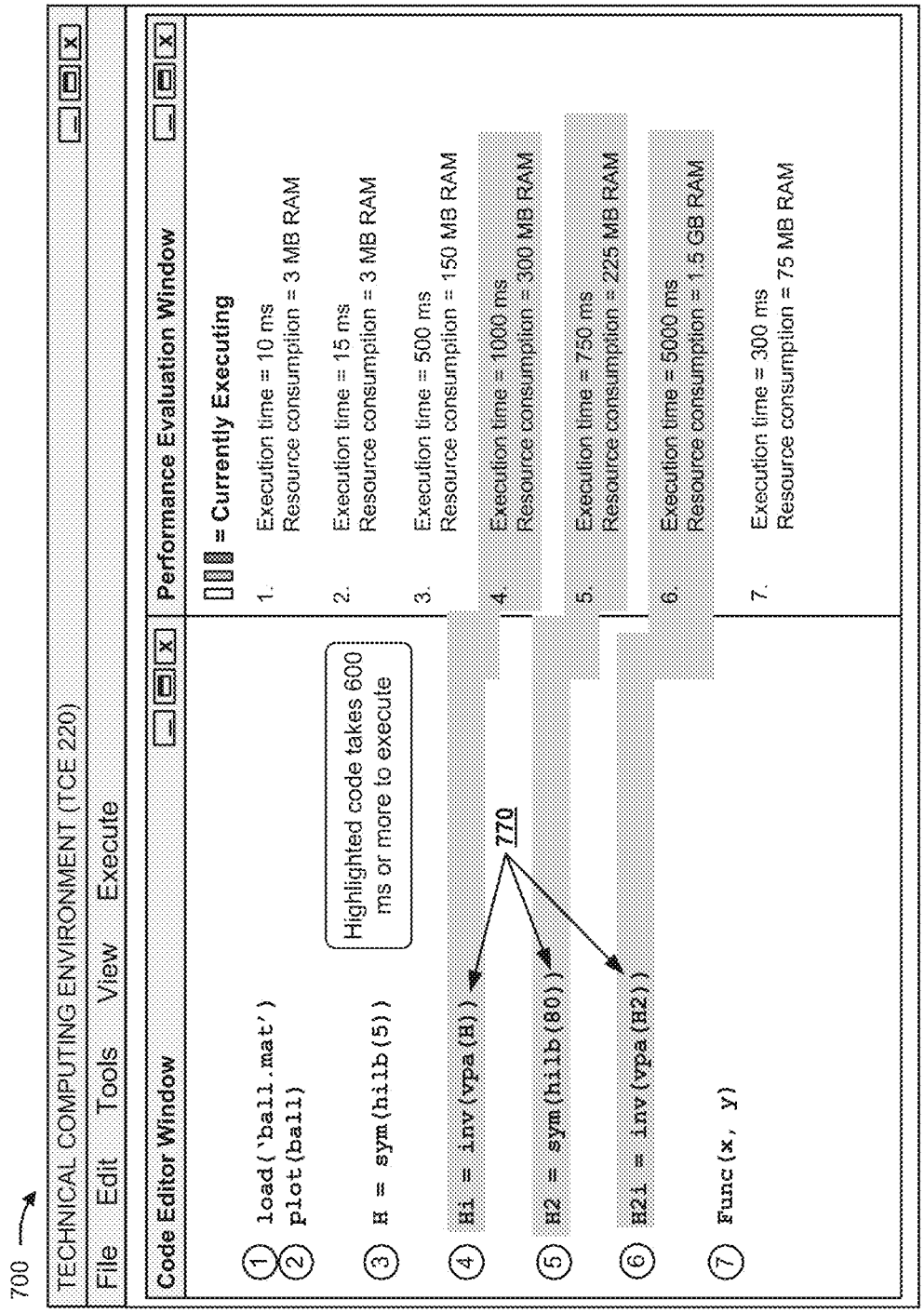

As shown in FIG. 7G, a user may provide input to determine program code partitions associated with performance characteristics that satisfy one or more thresholds. For example, as shown by reference number 765, assume that the user selects an input option to highlight program code portions that take more than six hundred milliseconds to execute. As shown in FIG. 7H, and by reference number 770, based on the user selection, client device 210 highlights three program code portions that executed in more than six hundred milliseconds, shown as Hi=inv(vpa(H)) (e.g., which executed in one thousand milliseconds), H2=sym(hilb(80)) (e.g., which executed in seven hundred fifty milliseconds), and H2i=inv (vpa(H2)) (e.g., which executed in five thousand milliseconds).

As indicated above, FIGS. 7A-7H are provided merely as an example. Other examples are possible and may differ from what was described with regard to FIGS. 7A-7H.

Figure 8A:
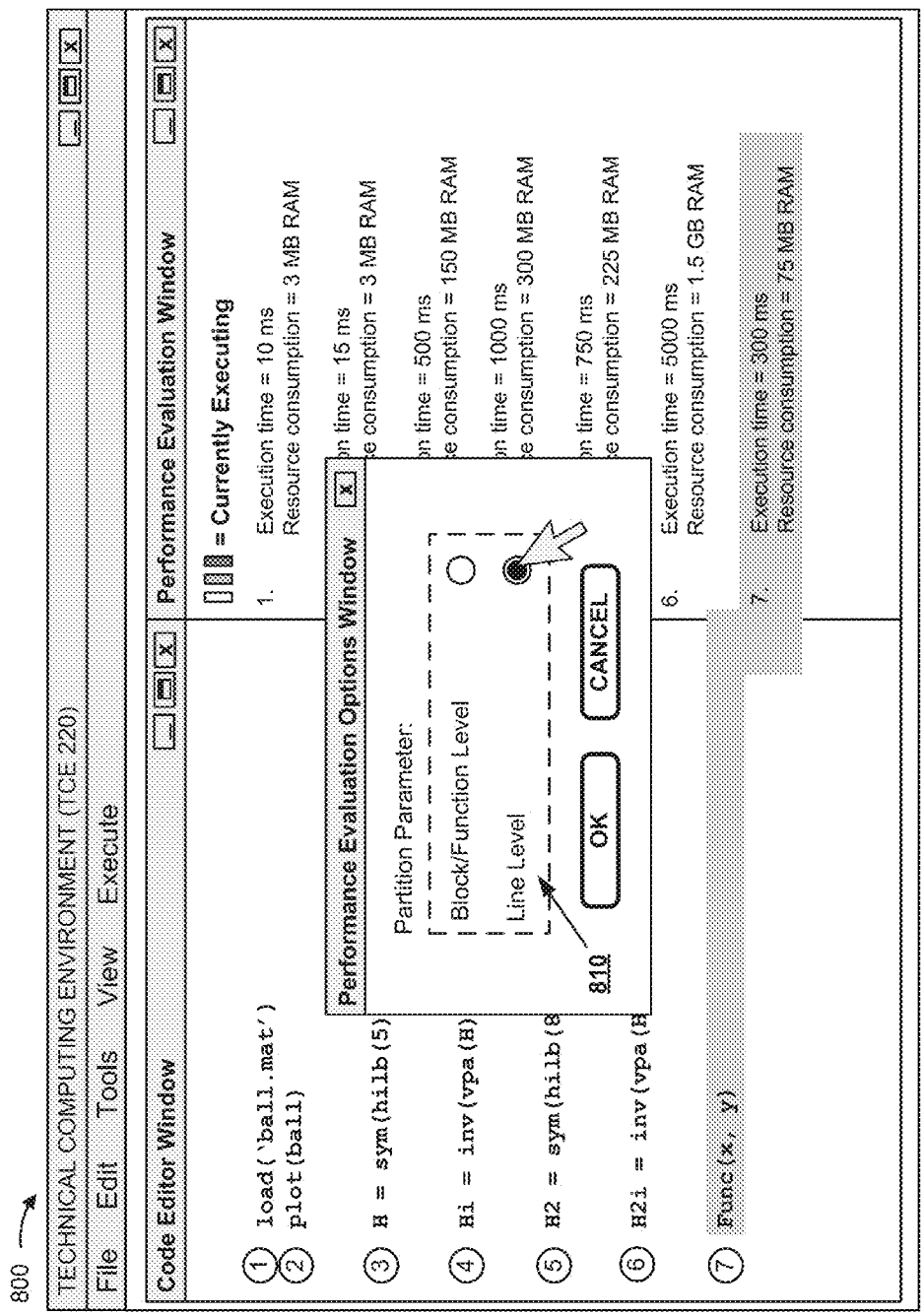

FIGS. 8A and 8B are diagrams of another example implementation 800 relating to example process 600 shown in FIG. 6. FIGS. 8A and 8B show an example of modifying an input option to partition code at a line level rather than a block/function level.

For the purpose of FIGS. 8A and 8B, assume that client device 210 executed the depicted program code portions and provided associated performance characteristics, as described herein in connection with FIGS. 7A-7H. Assume that client device 210 partitioned the program code at a function level, as described above. As shown in FIG. 8A, and by reference number 810, assume that the user selects an input option to partition code at a line level rather than a block/function level.

For the purpose of FIG. 8B, assume that client device 210 has received an indication to execute the program code, and has partitioned the program code at a line level. Further, assume that client device 210 has executed and provided performance characteristics for the first six partitions (e.g., up through H2i=inv(vpa(H2))). As shown by reference number 820, the function Func(x, y) includes three lines of program code, shown as z=x+y, z=z*z, and disp(z). When executing the function Func(x, y), client device 210 may provide these three lines of program code for display, and may display execution indicators for these three lines of program code.

For example, assume that while executing the function, client device 210 has finished executing the first and second lines of program code, shown as z=x+y and z=z*z. As shown by reference number 830, client device 210 provides an indication that client device 210 has finished executing these lines of program code. Further, as shown by reference number 840, client device 210 measures performance characteristics for the executed lines of program code, and provides the performance characteristics for display along with respective correspondence indicators.

As shown by reference number 850, client device 210 provides an execution indicator to indicate that the third line of code, disp(z), is currently executing. Furthermore, as shown by reference number 860, client device 210 provides an execution indicator to indicate that Func(x, y) is also executing (e.g., since disp(z) is included in the function Func (x, y)). As shown by reference number 870, client device 210 may provide performance characteristics associated with the function as a whole, and/or may provide performance characteristics associated with code lines included in the function.

As indicated above, FIGS. 8A and 8B are provided merely as an example. Other examples are possible and may differ from what was described with regard to FIGS. 8A and 8B.

Figure 9A:
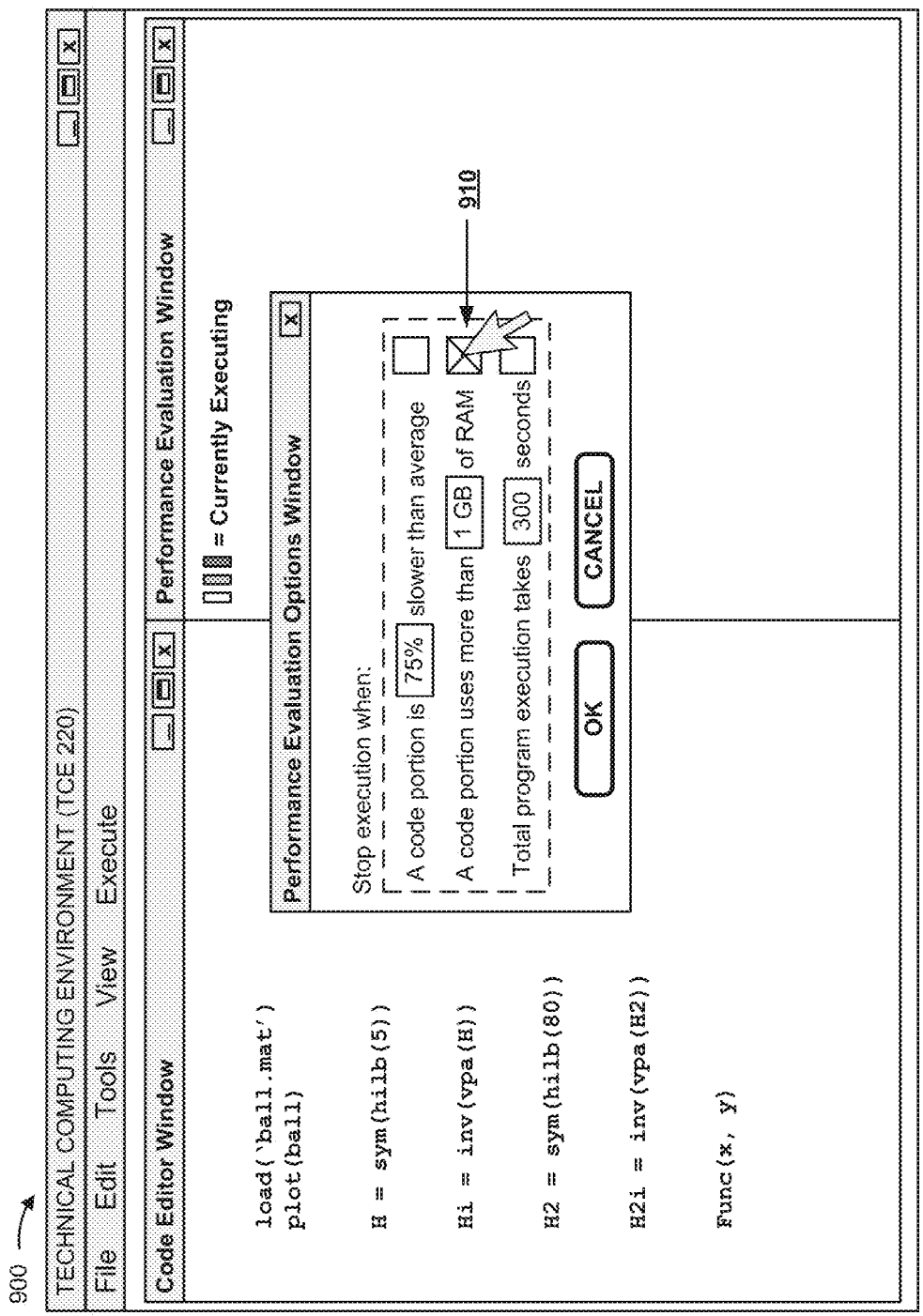
FIGS. 9A and 9B are diagrams of another example implementation relating to the example process shown in FIG. 6.
Figure 9B:
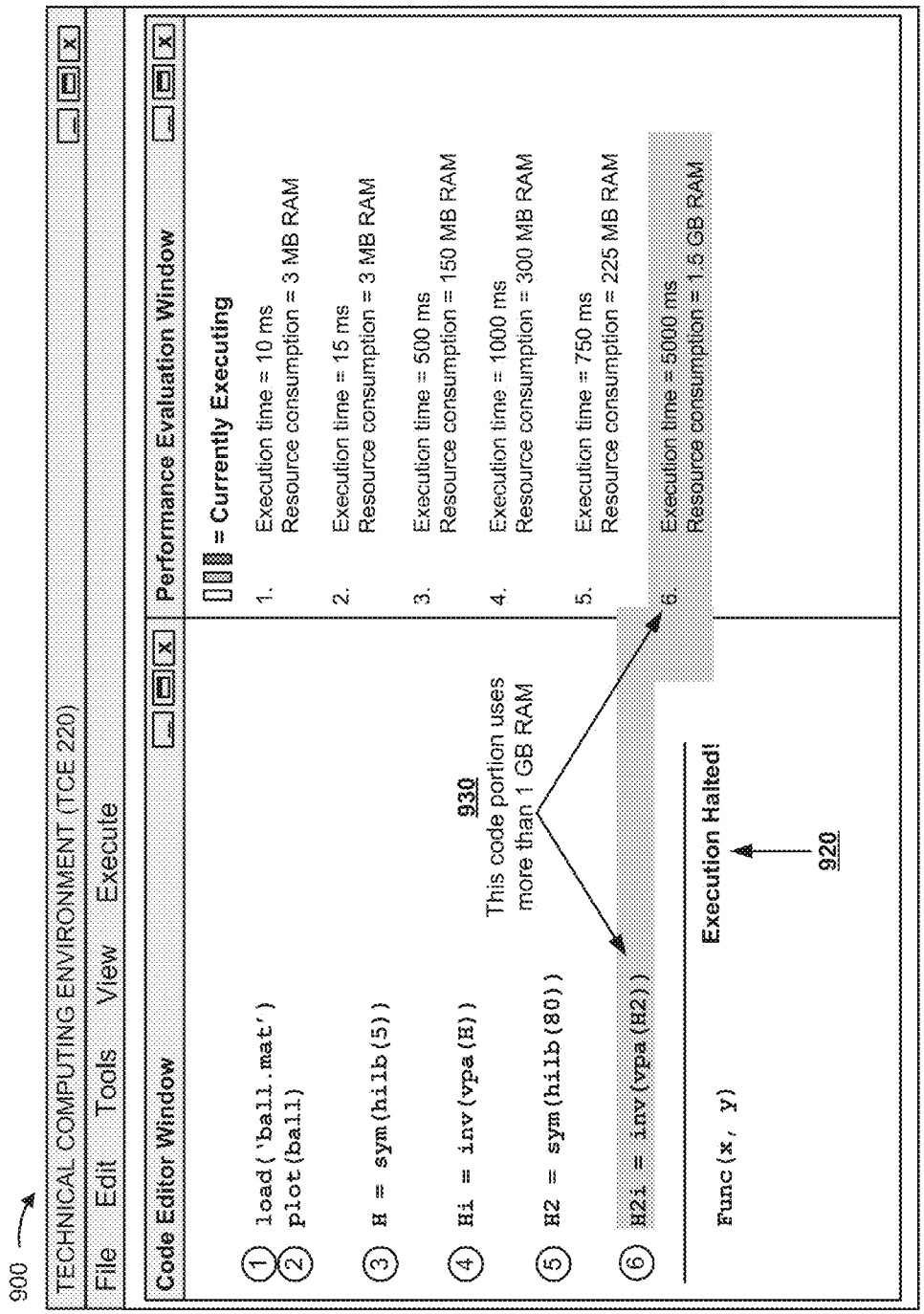

FIGS. 9A and 9B are diagrams of another example implementation 900 relating to example process 600 shown in FIG. 6. FIGS. 9A and 9B show an example of using a breakpoint condition to determine when to stop execution of a program.

As shown in FIG. 9A, and by reference number 910, assume that the user selects an input option to stop executing the program when a code portion uses more than one gigabyte (GB) of RAM. As shown in FIG. 9B, assume that client device 210 executes the program until a code portion is executed that consumes more than one gigabyte of RAM. For example, the sixth partition, shown as H2i=inv(vpa(H2)), consumes 1.5 gigabytes of RAM. Thus, after executing the sixth partition, client device 210 halts execution of the program, as shown by reference number 920. As shown by reference number 930, client device 210 provides an indication that execution halted because the sixth partition consumed more than one gigabyte of RAM.

As indicated above, FIGS. 9A and 9B are provided merely as an example. Other examples are possible and may differ from what was described with regard to FIGS. 9A and 9B.

FIGS. 10A-10D are diagrams of another example implementation 1000 relating to example process 600 shown in FIG. 6. FIGS. 10A-10D show an example of comparing performance characteristics of target code in different programming languages.

Figure 10A:
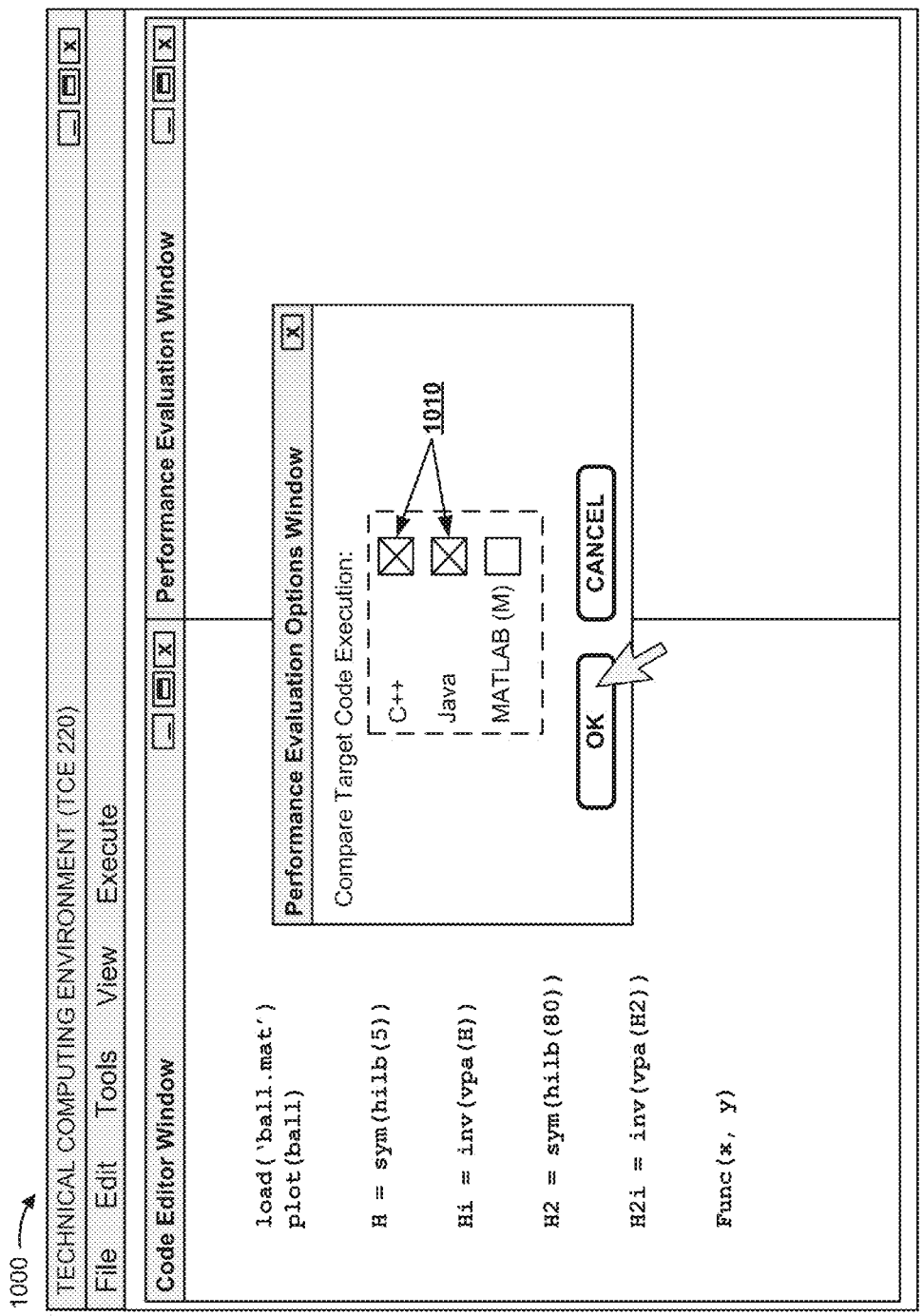

As shown in FIG. 10A, and by reference number 1010, assume that the user selects an input option to compare target code execution for C++ code and Java code. Based on the user selection, assume that client device 210 generates first target code (e.g., C++ code) and second target code (e.g., Java code) from the input code depicted in FIG. 10A.

For the purpose of FIG. 10B, assume that client device 210 has partitioned the C++ code and the Java code, and has begun execution of a first partition of the C++ code, generated from the input code load('ball.mat'), and the first partition of the Java code generated from the same input code load('ball.mat'). As shown in FIG. 10B, and by reference number 1020, assume that client device 210 provides different execution indicators associated with the different target code programming languages. For example, assume that client device 210 displays flashing bars next to a program code portion when the C++ code associated with that program code portion is currently executing, and displays a spinning circular arrow next to a program code portion when the Java code associated with that program code portion is currently executing.

As shown by reference number 1030, assume that client device 210 begins executing the C++ code and the Java code generated from the first program code portion (and/or provides the C++ code and the Java code to different server devices 230 for execution), and provides an execution indicator, for each version of target code, next to the first program code portion.

Figure 10C:
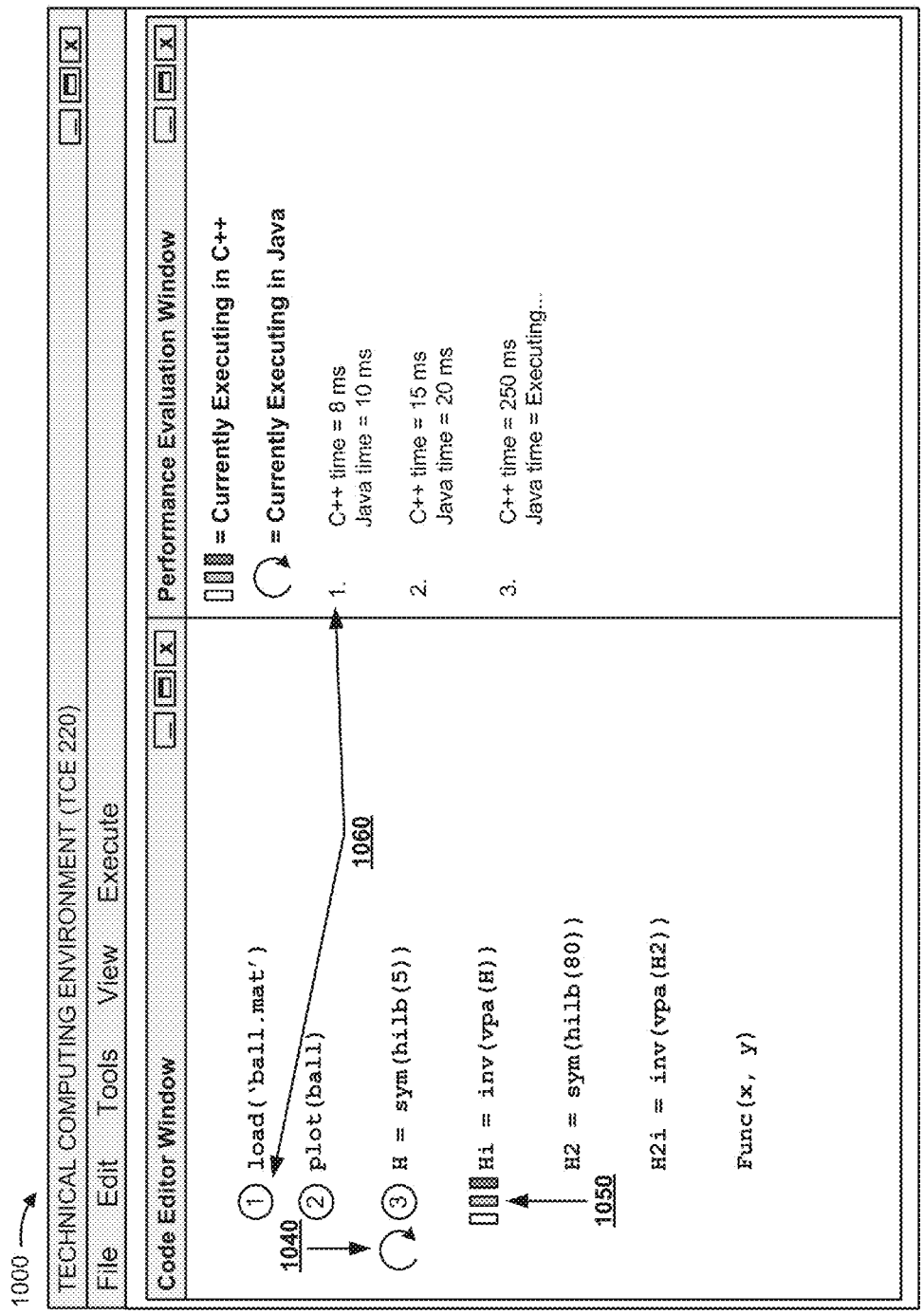

As show in FIG. 10C, assume that client device 210 has finished executing Java code corresponding to the first two program code portions, and is currently executing Java code corresponding to the third program code portion, shown as H=sym(hilb(5)). As shown by reference number 1040, client device 210 provides a Java code execution indicator next to the third program code portion. As further shown, assume that client device 210 has finished executing C++ code corresponding to the first three program code portions, and is currently executing C++ code corresponding to the fourth program code portion, shown as Hi=inv(vpa(H)). As shown by reference number 1050, client device 210 provides a C++ code execution indicator next to the fourth partition. In this way, a user can compare the performance of target code execution associated with different programming languages as the target code is executing.

As shown by reference number 1060, when client device 210 finishes executing a program code portion, client device 210 may provide performance characteristics associated with executing target code generated from the program code portion. For example, client device 210 provides an indication that C++ code corresponding to the first program code portion executed in eight milliseconds, and that Java code corresponding to the first program code portion executed in ten milliseconds.

As shown in FIG. 10D, assume that client device 210 finishes executing the target C++ code and the target Java code. As shown by reference number 1070, client device 210 provides an indication of a performance characteristic associated with execution of the entire program. For example, client device 210 provides an indication that all of the C++ code executed in seven thousand milliseconds, and all of the Java code executed in nine thousand milliseconds. In this way, a user may compare performance of different programming languages when executing a particular program.

As indicated above, FIGS. 10A-10D are provided merely as an example. Other examples are possible and may differ from what was described with regard to FIGS. 10A-10D.

Figure 11A:
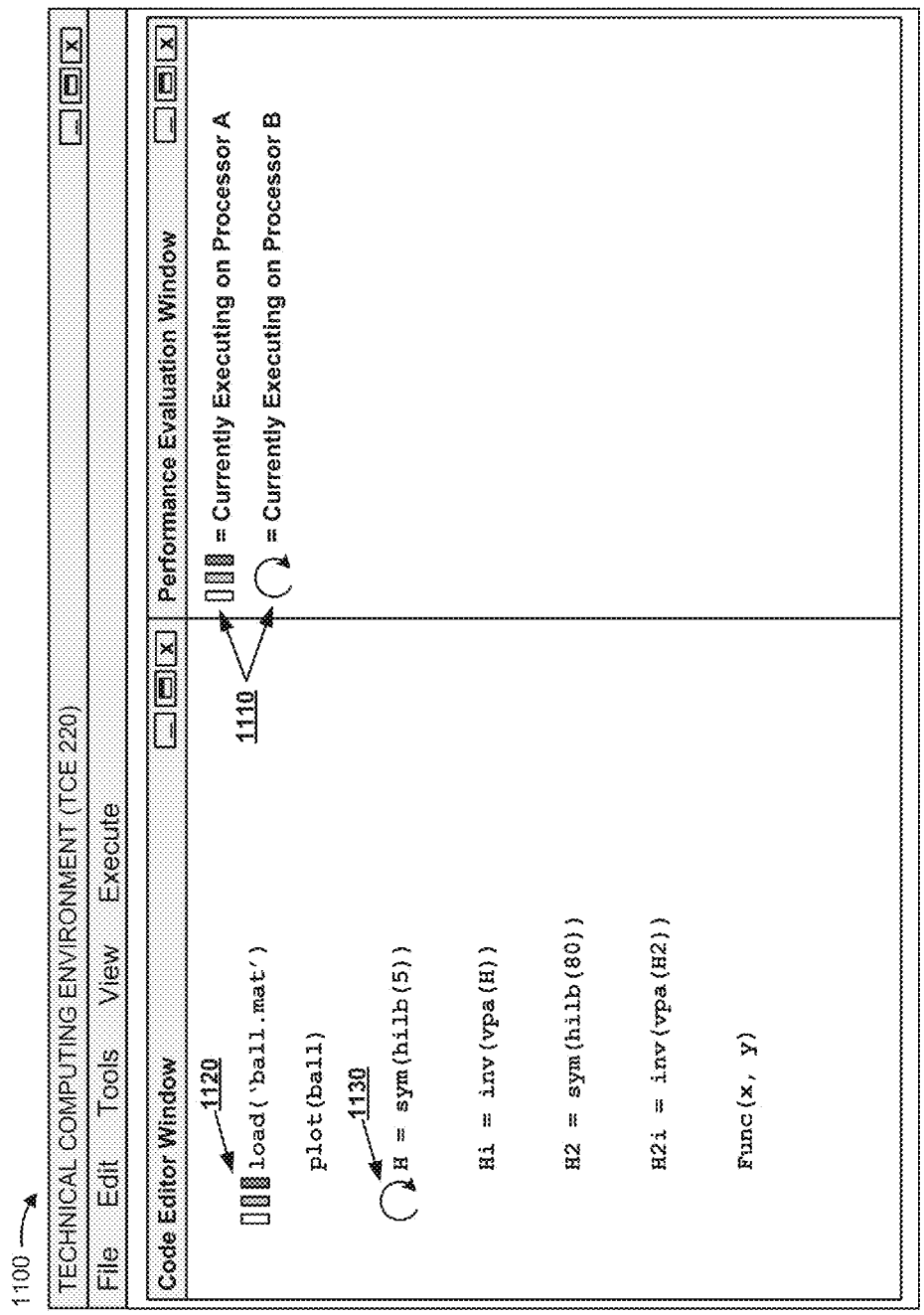
Figure 11C:
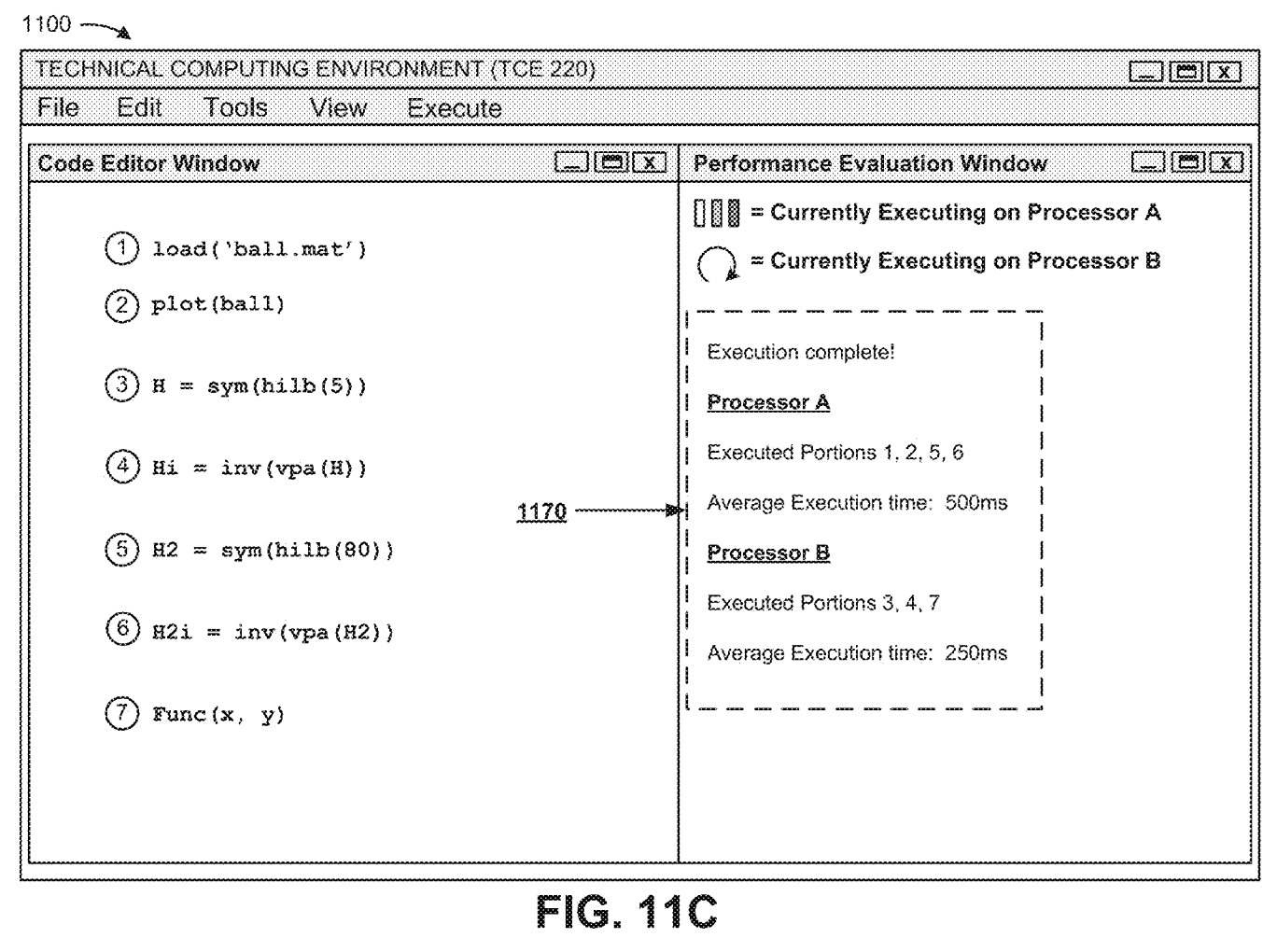

FIGS. 11A-11C are diagrams of another example implementation 1100 relating to example process 600 shown in FIG. 6. FIGS. 11A-11C show an example of comparing performance characteristics of program code that executes on different processors (e.g., in a distributed computing environment).

For the purpose of FIG. 11A, assume that the user selects an input option to compare program code execution performance on different processors. Further, assume that client device 210 has partitioned the program code, and has provided a first line of program code, shown as load('ball.mat'), to a first processor, shown as Processor A, for execution. Further, assume that client device 210 has provided a third line of program code, shown as H=sym(hilb(5)), to a second processor, shown as Processor B, for execution. As shown by reference number 1110, assume that client device 210 provides different execution indicators associated with the different processors. For example, assume that client device 210 displays flashing bars next to a program code portion being executed by Processor A, and displays a spinning circular arrow next to a program code portion being executed by Processor B.

As shown by reference number 1120, assume that Processor A begins executing the first line of program code, and that client device 210 provides an indication, next to the first line of program code, that Processor A is currently executing the first line of program code. As shown by reference number 1130, assume that Processor B begins executing the third line of program code, and that client device 210 provides an indication, next to the third line of program code, that Processor B is currently executing the third line of program code.

As show in FIG. 11B, assume that Processor A has finished executing the first line of program code and the second line of program code, and is currently executing the fifth line of program code, shown as H2=sym(hilb(80)). As shown by reference number 1140, client device 210 provides a Processor A execution indicator next to the fifth line of program code. As further shown, assume that Processor B has finished executing the third line of program code, and is currently executing the fourth line of program code, shown as Hi=inv (vpa(H)). As shown by reference number 1150, client device 210 provides a Processor B execution indicator next to the fourth line of program code. In this way, a user can visualize which processor, in a distributed computing environment, is executing which portion of program code.

As shown by reference number 1160, when a processor finishes executing a program code portion, client device 210 may provide performance characteristics associated with executing the program code portion. For example, client device 210 provides an indication that Processor A executed the first line of program code in eight milliseconds, that Processor A executed the second line of program code in 10 milliseconds, and that Processor B executed the third line of program code in 15 milliseconds.

As shown in FIG. 11C, assume that Processors A and B finish executing the program code. As shown by reference number 1170, client device 210 provides an indication of a performance characteristic associated with execution of the different program code portions by the difference processors.

For example, client device 210 provides an indication that Processor A executed program code portions 1, 2, 5, and 6, and that the average execution time (or, as another example, a total execution time) of Processor A was 500 milliseconds. Furthermore, client device 210 provides an indication that Processor B executed program code portions 3, 4, and 7, and that the average execution time of Processor B was 250 milliseconds. In this way, a user may compare performance of different processors used to execute program code.

As indicated above, FIGS. 11A-11C are provided merely as an example. Other examples are possible and may differ from what was described with regard to FIGS. 11A-11C.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more hardware processors to:
   receive an indication to perform a performance evaluation of program code that is being provided via a user interface of a computer programming environment;
   partition the program code into a plurality of program code portions based on receiving the indication to perform the performance evaluation;
   execute a first program code portion of the plurality of program code portions;
   determine that the first program code portion has finished executing;
   determine a performance characteristic associated with execution of the first program code portion based on determining that the first program code portion has finished executing;
   execute a second program code portion of the plurality of program code portions;
   provide, via the user interface, information that identifies the performance characteristic,
      the information that identifies the performance characteristic being provided while the second program code portion is being executed; and
   provide, via the user interface, an indication of a correspondence between the first program code portion, provided via the user interface, and the information that identifies the performance characteristic.

2. The device of claim 1, where the one or more processors, when executing the first program code portion, are further to:
   provide an indication that the first program code portion is being executed;
   where the one or more processors, when executing the second program code portion, are further to:
   provide an indication that the first program code portion has finished executing based on determining that the first program code portion has finished executing; and
   provide an indication that the second program code portion is being executed.

3. The device of claim 2, where the program code is associated with a first programming language; and
   where the one or more processors are further to:
   receive information that identifies a second programming language,
      the second programming language being different from the first programming language;
   generate target code based on the program code and the second programming language;
   partition the target code into a plurality of target code portions;
   execute a target code portion of the plurality of target code portions; and
   provide, while providing the indication that the first program code portion is being executed or while providing the indication that the second program code portion is being executed, an indication that the target code portion is being executed.

4. The device of claim 1, where the one or more processors are further to:
   receive information that identifies an execution speed at which the plurality of program code portions are to be executed; and
   where the one or more processors, when executing the first program code portion and the second program code portion, are further to:
   execute the first program code portion and the second program code portion based on the execution speed.

5. The device of claim 1, where the one or more processors are further to:
   receive information that identifies a programming language;
   generate target code based on the program code and the programming language;
   partition the target code into a plurality of target code portions;

execute a target code portion of the plurality of target code portions;

determine another performance characteristic associated with execution of the target code portion;

provide information that identifies the other performance characteristic; and provide an indication of a correspondence between the performance characteristic and the other performance characteristic.

6. The device of claim 1, where the performance characteristic includes at least one of:

amount of time that the first program code portion took to execute, or an amount of resources consumed by execution of the first program code portion; and where the one or more processors, when providing the information that identifies the performance characteristic, are to provide the at least one of:

the amount of time that the first program code portion took to execute, or the amount of resources consumed by execution of the first program code portion.

7. The device of claim 1, where the one or more processors, when partitioning the program code into the plurality of program code portions, are to partition the program code into at least one of:

a plurality of lines of the program code,
the first program code portion being a first line of the program code, and
the second program code portion being a second line of the program code;

a plurality of blocks of the program code,
the first program code portion being a first block of the program code, and
the second program code portion being a second block of the program code; or a plurality of functions included in the program code, and
the first program code portion being a first function,
the second program code portion being a second function.

8. A non-transitory computer-readable medium storing instructions, the instructions comprising:

one or more instructions that, when executed by one or more processors, cause the one or more processors to:

obtain program code;

provide the program code for display via a user interface;

partition the program code into a plurality of program code portions;

execute a first program code portion of the plurality of program code portions;

provide, during execution of the first program code portion and via the user interface, a first indication that the first program code portion is being executed,
the first indication being provided via the user interface in a manner that indicates a correspondence between the first indication and the first program code portion;

determine that the first program code portion has finished executing;

remove, from the user interface, the first indication that the first program code portion is being executed based on determining that the first program code portion has finished executing;

execute a second program code portion, of the plurality of program code portions, based on determining that the first program code portion has finished executing; and provide, during execution of the second program code portion and via the user interface, a second indication that the second program code portion is being executed,
the second indication being provided via the user interface in a manner that indicates a correspondence between the second indication and the second program code portion.

9. The non-transitory computer-readable medium of claim 8, where the one or more instructions further cause the one or more processors to:

determine a performance characteristic associated with the execution of the first program code portion based on determining that the first program code portion has finished executing; and provide, via the user interface and before the second program code portion finishes executing, information that identifies the performance characteristic.

10. The non-transitory computer-readable medium of claim 9, where the performance characteristic is a first performance characteristic; and where the one or more instructions further cause the one or more processors to:

determine that the second program code portion has finished executing;

determine a second performance characteristic associated with the execution of the second program code portion based on determining that the second program code portion has finished executing; and provide, via the user interface and while the information that identifies the first performance characteristic is being provided via the user interface, information that identifies the second performance characteristic.

11. The non-transitory computer-readable medium of claim 8, where the one or more instructions further cause the one or more processors to:

receive information that identifies a partition parameter that controls a manner in which the program code is to be partitioned; and where the one or more instructions, that cause the one or more processors to partition the program code, further cause the one or more processors to:

partition the program code based on the partition parameter.

12. The non-transitory computer-readable medium of claim 8, where the one or more instructions further cause the one or more processors to:

receive information that identifies an execution speed at which the first program code portion is to be executed,
the execution speed impacting an amount of time that the first indication is provided via the user interface; and where the one or more instructions, that cause the one or more processors to execute the first program code portion, further cause the one or more processors to:

execute the first program code portion based on the execution speed.

13. The non-transitory computer-readable medium of claim 12, where the execution speed is a first execution speed; and where the one or more instructions further cause the one or more processors to:

receive information that identifies a second execution speed at which the second program code portion is to be executed,
the second execution speed being different from the first execution speed; and
where the one or more instructions, that cause the one or more processors to execute the second program code portion, further cause the one or more processors to:
execute the second program code portion based on the second execution speed.

14. The non-transitory computer-readable medium of claim 8, where the program code is associated with a first programming language; and
where the one or more instructions further cause the one or more processors to:
receive information that identifies a second programming language,
the second programming language being different from the first programming language;
generate target code, in the second programming language, using the program code;
partition the target code into a plurality of target code portions;
execute a target code portion of the plurality of target code portions; and
provide, while providing the first indication or while providing the second indication, a third indication that the target code portion is being executed,
the third indication being provided via the user interface in a manner that indicates a correspondence between the third indication and a program code portion, of the plurality of program code portions, used to generate the target code portion.

15. A method, comprising:
partitioning program code into a plurality of program code portions for a performance evaluation,
the partitioning being performed by one or more devices;
executing a first program code portion, of the plurality of program code portions, provided for display via a user interface,
the executing the first program code portion being performed by the one or more devices;
determining that the first program code portion has finished executing,
the determining that the first program code portion has finished executing being performed by the one or more devices;
determining a performance characteristic, associated with execution of the first program code portion, based on determining that the first program code portion has finished executing,
the determining the performance characteristic being performed by the one or more devices;
executing a second program code portion, of the plurality of program code portions, provided for display via the user interface,
the second program code portion being different from the first program code portion,
the executing the second program code portion being performed by the one or more devices;
providing, via the user interface and before the second program code portion has finished executing, information that identifies the performance characteristic,
the providing the information being performed by the one or more devices; and
providing, via the user interface, an indication of a correspondence between the first program code portion and the information that identifies the performance characteristic,
the providing the indication being performed by the one or more devices.

16. The method of claim 15, further comprising:
providing, via the user interface and during the execution of the first program code portion, an indication that the first program code portion is being executed; and
removing, from the user interface, the indication that the first program code portion is being executed based on determining that the first program code portion has finished executing.

17. The method of claim 15, where the program code is associated with a first programming language, and where the performance characteristic is a first performance characteristic; and
where the method further comprises:
receiving information that identifies a second programming language,
the second programming language being different from the first programming language;
generating target code based on the program code and the second programming language;
partitioning the target code into a plurality of target code portions;
executing a target code portion of the plurality of target code portions,
the target code portion being generated based on the first program code portion;
determining a second performance characteristic, associated with execution of the target code portion, based on executing the target code portion;
providing, via the user interface, information that identifies the second performance characteristic; and
providing, via the user interface, an indication of a correspondence between the first performance characteristic and the second performance characteristic.

18. The method of claim 15, where determining the performance characteristic comprises:
determining at least one of:
an amount of time spent executing the first program code portion, or
an amount of resources consumed by executing the first program code portion.

19. The method of claim 15, further comprising:
receiving information that identifies a breakpoint condition for stopping execution of the program code;
determining that the breakpoint condition is satisfied based on executing the second program code portion; and
stopping execution of the second program code portion based on determining that the breakpoint condition is satisfied.

20. The method of claim 15, further comprising:
receiving information that identifies a threshold value;
determining that the performance characteristic satisfies the threshold value; and
providing, via the user interface, an indication that the performance characteristic satisfies the threshold value based on determining that the performance characteristic satisfies the threshold value.

* * * * *